United States Patent
Iwamoto

(10) Patent No.: US 11,011,786 B2
(45) Date of Patent: May 18, 2021

(54) BATTERY AND BATTERY SYSTEM

(71) Applicant: PANASONIC INTELLECTUAL PROPERTY MANAGEMENT CO., LTD., Osaka (JP)

(72) Inventor: Kazuya Iwamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 109 days.

(21) Appl. No.: 16/291,522

(22) Filed: Mar. 4, 2019

(65) Prior Publication Data
US 2019/0198948 A1    Jun. 27, 2019

Related U.S. Application Data

(62) Division of application No. 15/465,655, filed on Mar. 22, 2017, now abandoned.

(30) Foreign Application Priority Data

Apr. 25, 2016 (JP) .................. 2016-086785
Oct. 20, 2016 (JP) .................. 2016-205695

(51) Int. Cl.
*H01M 10/52* (2006.01)
*H01M 2/12* (2006.01)
(Continued)

(52) U.S. Cl.
CPC ....... *H01M 10/52* (2013.01); *H01M 10/0525* (2013.01); *H01M 10/48* (2013.01); *H01M 50/20* (2021.01); *H01M 50/317* (2021.01)

(58) Field of Classification Search
CPC ............ H01M 2/02; H01M 2/12; H01M 2/10; H01M 10/52; H01M 10/48
See application file for complete search history.

(56) References Cited

U.S. PATENT DOCUMENTS

| 5,856,037 A | 1/1999 | Casale et al. |
| 2010/0297479 A1* | 11/2010 | Tsuchida ................. H01M 6/18 429/49 |

(Continued)

FOREIGN PATENT DOCUMENTS

| JP | 2004-087152 A | 3/2004 |
| JP | 2008-103245 A | 5/2008 |

(Continued)

OTHER PUBLICATIONS

Non-Final Office Action issued in U.S. Appl. No. 15/465,655, dated Dec. 20, 2018.

*Primary Examiner* — Kenneth J Douyette
(74) *Attorney, Agent, or Firm* — McDermott Will & Emery LLP

(57) ABSTRACT

A battery includes an outer packaging and a power generating element that contains a sulfur-based material and is included in the outer packaging and disposed in the inside of the outer packaging. The outer packaging includes a communicating port, a hydrogen sulfide eliminator, and an exhausting unit. The communicating port communicates between the inside and the outside of the outer packaging. The hydrogen sulfide eliminator and the exhausting unit are disposed in the communicating port. The exhausting unit introduces hydrogen sulfide generated caused by the sulfur-based material to the communicating port. The hydrogen sulfide eliminator eliminates the hydrogen sulfide introduced by the exhausting unit to the communicating port.

18 Claims, 21 Drawing Sheets

(51) Int. Cl.
*H01M 10/48* (2006.01)
*H01M 10/0525* (2010.01)
*H01M 50/20* (2021.01)
*H01M 50/317* (2021.01)

(56) References Cited

U.S. PATENT DOCUMENTS

2012/0015220 A1* 1/2012 Kawaoka ............ H01M 10/052
  429/90
2012/0070703 A1  3/2012 Wahl et al.
2015/0162582 A1  6/2015 Metz et al.
2016/0166971 A1  6/2016 Fukuhara et al.

FOREIGN PATENT DOCUMENTS

| | | |
|---|---|---|
| JP | 2009-289655 A | 12/2009 |
| JP | 2011-113803 A | 6/2011 |
| JP | 2012-517080 A | 7/2012 |
| JP | 2013-039006 A | 2/2013 |
| WO | 2011/055429 A1 | 5/2011 |
| WO | 2015/029567 A1 | 3/2015 |

* cited by examiner

1000

FIG. 2
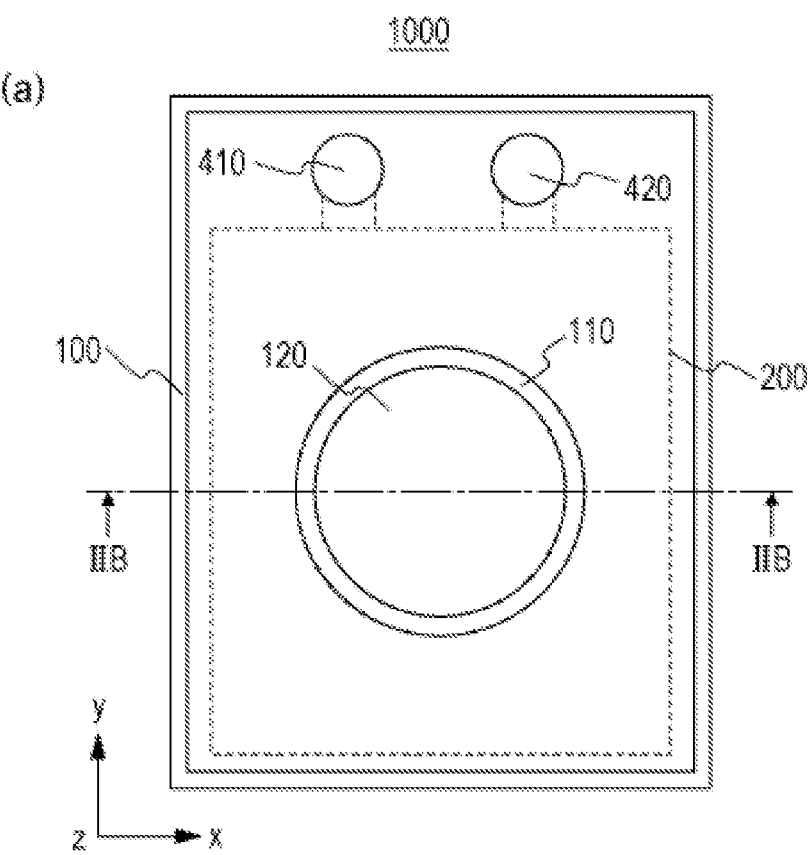
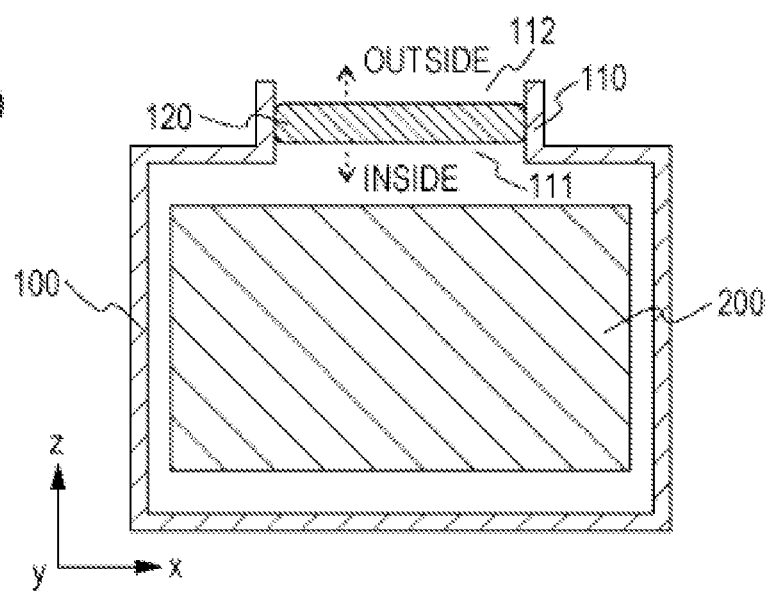

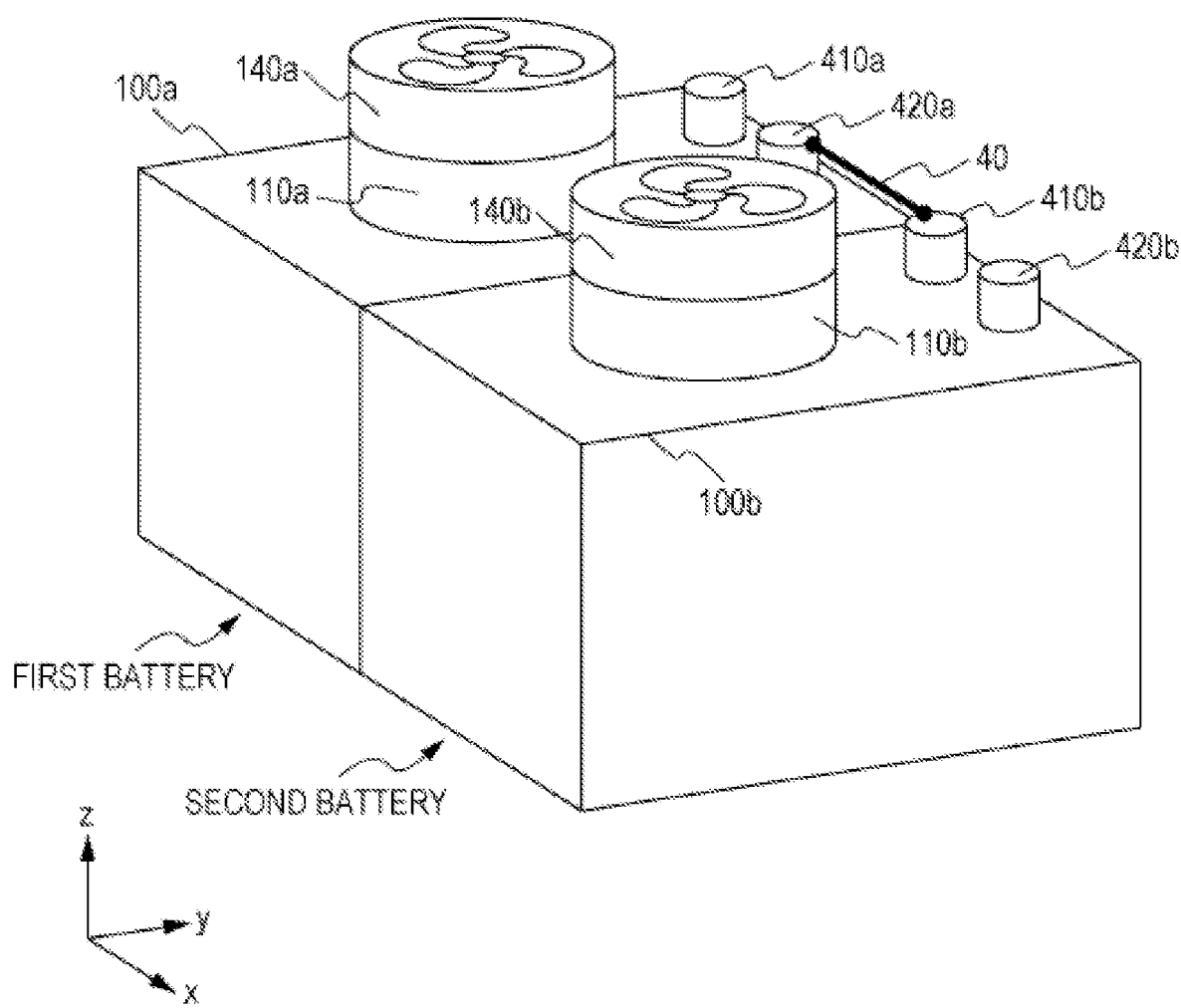

BATTERY AND BATTERY SYSTEM

CROSS-REFERENCE OF RELATED APPLICATIONS

This application is a Divisional application of the U.S. patent application Ser. No. 15/465,655, filed on Mar. 22, 2017, now abandoned, which in turn claims the benefit of Japanese Application No. 2016-205695, filed on Oct. 20, 2016 and Japanese Application No. 2016-086785, filed on Apr. 25, 2016, the entire disclosures of which Applications are incorporated by reference herein.

BACKGROUND

1. Technical Field

The present disclosure relates to a battery and a battery system.

2. Description of the Related Art

Japanese Unexamined Patent Application Publication No. 2008-103245 discloses a sulfide-based secondary battery including a battery cell containing a sulfur compound that generates a hydrogen sulfide gas by decomposition thereof, wherein the periphery of the battery cell is covered with a material that traps and detoxifies the hydrogen sulfide gas.

Japanese Unexamined Patent Application Publication No. 2011-113803 discloses an all-solid-state battery having an exterior material consisting of a chassis and a lid, wherein the chassis includes a first depression for accommodating a power generating element, a second depression formed in the circumference of the first depression for accommodating a hydrogen sulfide-detoxifying unit, and an adhesion unit having a circumferential adhesion portion arranged in the circumference of the second depression; and the lid adheres to the circumferential adhesion portion to seal the first and second depressions.

Japanese Unexamined Patent Application Publication No. 2004-087152 discloses a sodium-sulfur battery system including a sodium-sulfur battery and an adsorbent disposed at the outside of the sodium-sulfur battery and adsorbing a sulfur gas, a sulfur dioxide gas, and/or a hydrogen sulfide gas.

SUMMARY

In known techniques, hydrogen sulfide is desired to be efficiently eliminated.

In one general aspect, the techniques disclosed here feature a battery comprising an outer packaging and a power generating element that contains a sulfur-based material and is included in the outer packaging and disposed in the inside of the outer packaging. The outer packaging includes a communicating port, a hydrogen sulfide eliminator, and an exhausting unit. The communicating port communicates between the inside and the outside of the outer packaging. The hydrogen sulfide eliminator and the exhausting unit are disposed in the communicating port. The exhausting unit introduces hydrogen sulfide generated caused by the sulfur-based material to the communicating port. The hydrogen sulfide eliminator eliminates the hydrogen sulfide introduced to the communicating port by the exhausting unit.

According to the present disclosure, hydrogen sulfide can be efficiently eliminated.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 includes diagrams schematically illustrating the structure of the battery in Embodiment 1;

FIG. 21 is a perspective view schematically illustrating the structure of a battery pack in Embodiment 8.

DETAILED DESCRIPTION

Embodiments of the present disclosure will now be described with reference to the drawings.

Embodiment 1

Figure 1:
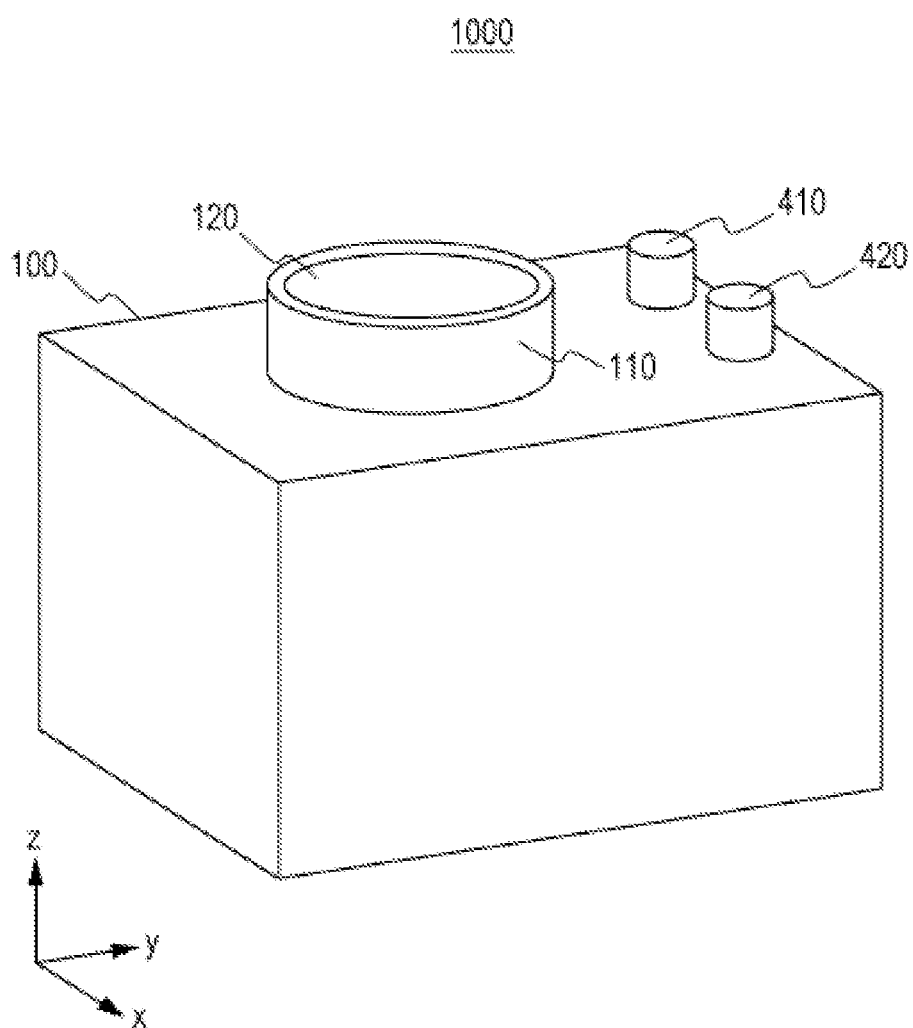
FIG. 1 is a perspective view schematically illustrating the structure of a battery in Embodiment 1.

FIG. 1 is a perspective view schematically illustrating the structure of a battery 1000 in Embodiment 1.

FIG. 2 includes diagrams schematically illustrating the structure of the battery 1000 in Embodiment 1.

FIG. 2(a) is an x-y view (top perspective view) schematically illustrating the structure of the battery 1000 in Embodiment 1.

FIG. 2(b) is an x-z view (IIB-IIB cross-sectional view) schematically illustrating the structure of the battery 1000 in Embodiment 1.

The battery 1000 in Embodiment 1 includes an outer packaging 100 and a power generating element 200.

The power generating element 200 contains a sulfur-based material.

The power generating element 200 is included in the outer packaging 100 and is disposed (accommodated) in the inside of the outer packaging 100.

The outer packaging 100 includes a communicating port 110 and a hydrogen sulfide eliminator 120 (i.e., hydrogen sulfide eliminating unit).

The communicating port 110 communicates between the inside and the outside of the outer packaging 100.

The hydrogen sulfide eliminator 120 is disposed in the communicating port 110.

The hydrogen sulfide eliminator 120 eliminates hydrogen sulfide generated caused by the sulfur-based material contained in the power generating element 200.

The structure described above can efficiently eliminate hydrogen sulfide. That is, the hydrogen sulfide eliminator 120 is installed to the outer packaging 100 itself, instead of being installed to the inside of the battery included in the outer packaging 100, resulting in installation of the hydrogen sulfide eliminator 120 without reducing the volume energy density of the power generating element 200. That is, for example, it is possible to avoid that the hydrogen sulfide eliminator 120 increases the thickness or the volume of the internal structure (for example, members other than the power generating element 200) of the battery included in the outer packaging 100. In addition, for example, even if the outer packaging 100 includes a plurality of battery cells as the power generating element 200, the hydrogen sulfide eliminator 120 is not needed to be provided to each of the battery cells. Accordingly, an increase in the thickness or the volume of each of the battery cells by the hydrogen sulfide eliminator 120 can be avoided. Thus, detoxification of hydrogen sulfide can be realized by the hydrogen sulfide eliminator 120 installed to the outer packaging 100, without reducing the volume energy density of the power generating element 200.

In contrast, a structure of providing a hydrogen sulfide eliminator 120 to each single battery cell unit (for example, the structure disclosed in Japanese Unexamined Patent Application Publication No. 2008-103245 or 2011-113803) causes an enormous decrease in the energy density in a battery module (or battery pack) constituted of a plurality of the single battery cells.

Furthermore, the structure of Embodiment 1 described above can simplify the process of producing the battery. That is, for example, the process of disposing the hydrogen sulfide eliminator 120 in the inside of the battery included in the outer packaging 100 is unnecessary. As a result, a complicated process, such as a process of producing a member composed of a combination of a power generating element 200 and a hydrogen sulfide eliminator 120, can be omitted.

In contrast, a structure requiring a member composed of a combination of the power generating element 200 and the hydrogen sulfide eliminator 120 (for example, the structure disclosed in Japanese Unexamined Patent Application Publication No. 2008-103245 or 2011-113803) complicates the process of producing a battery.

Furthermore, the structure of Embodiment 1 described above can limit the exhaust portion for exhausting hydrogen sulfide generated in the inside of the outer packaging 100 to the position at which the communicating port 110 is installed. That is, the position (or direction) for exhausting hydrogen sulfide can be adjusted by controlling the position of installing the communicating port 110 in the outer packaging 100. As a result, hydrogen sulfide can be exhausted without being dispersed to portions other than the target position as the exhaust portion. In addition, in the case of constituting a battery system (power source system) including the battery 1000 of Embodiment 1, the portion for exhausting hydrogen sulfide can be restricted. Consequently, the path for exhausting hydrogen sulfide can be readily designed. For example, in the case of constituting an on-vehicle battery system (power source system) including the battery 1000 of Embodiment 1, the exhaust path to the outside of a vehicle can be readily designed. Accordingly, inflow of hydrogen sulfide into the inside of the vehicle can be more certainly prevented.

In contrast, the structure of not having communicating port 110 and thereby not restricting the exhaust portion of hydrogen sulfide (for example, the structure disclosed in Japanese Unexamined Patent Application Publication No. 2008-103245 or 2011-113803) releases and disperses hydrogen sulfide from an unexpected position. Accordingly, the path for exhausting hydrogen sulfide cannot be readily designed.

The outer packaging 100 can have a generally known shape as that (e.g., square or cylindrical shape) of the outer packaging of a battery module (or battery pack). The outer packaging 100 may be, for example, a box or housing.

The outer packaging 100 may be made of a generally known material as that (e.g., a metal or a resin) for the outer packaging of a battery module (or battery pack).

As shown in FIGS. 1 and 2, the communicating port 110 is disposed on a side face of the outer packaging 100.

Alternatively, the communicating port 110 may be disposed at a portion (for example, a corner) other than the side faces of the outer packaging 100.

The communicating port 110 includes an inside opening 111 and an outside opening 112.

The inside opening 111 is located in the inside of the outer packaging 100 and may have any shape, such as a circular, elliptical, rectangular, or linear shape.

The outside opening 112 is located in the outside of the outer packaging 100 and may have any shape, such as a circular, elliptical, rectangular, or linear shape.

The shape of the inside opening 111 and the shape of the outside opening 112 may be the same or different.

The size of the inside opening 111 and the size of the outside opening 112 may be the same or different.

The hydrogen sulfide eliminator 120 may be disposed between the inside opening 111 and the outside opening 112 as shown in FIG. 2.

Alternatively, the hydrogen sulfide eliminator 120 may be disposed in the communicating port 110 such that a part of the hydrogen sulfide eliminator 120 protrudes to the inside than the inside opening 111.

Alternatively, the hydrogen sulfide eliminator 120 may be disposed in the communicating port 110 such that a part of the hydrogen sulfide eliminator 120 protrudes to the outside than the outside opening 112.

The hydrogen sulfide eliminator 120 may be disposed over the whole inside of the communicating port 110 as shown in FIGS. 1 and 2. For example, the inside of the communicating port 110 may be filled with the hydrogen sulfide eliminator 120.

The structure described above can more certainly introduce hydrogen sulfide to the hydrogen sulfide eliminator 120. As a result, the hydrogen sulfide eliminator 120 can more certainly eliminate hydrogen sulfide.

The hydrogen sulfide eliminator 120 disposed over the whole inside of the communicating port 110 can have a gas-permeable type structure that allows gas to permeate therethrough. The gas-permeable type hydrogen sulfide eliminator 120 can be, for example, the structure of a generally known gas absorption can for gas mask.

The hydrogen sulfide eliminator 120 may eliminate hydrogen sulfide by, for example, absorbing the hydrogen sulfide. That is, the hydrogen sulfide eliminator 120 may be a hydrogen sulfide absorber for absorbing hydrogen sulfide.

Alternatively, the hydrogen sulfide eliminator 120 may have a structure for detoxifying hydrogen sulfide by a method other than absorption.

As the material for the hydrogen sulfide eliminator 120, for example, a material that chemically or physically adsorbs and detoxifies a hydrogen sulfide gas can be used. The material that can chemically adsorb and detoxify a hydrogen sulfide gas is, for example, an alkaline material (e.g., NaOH, KOH, $Ca(OH)_2$, or $Mg(OH)_2$). In such a case, the hydrogen sulfide eliminator 120 may include microcapsules having gas permeability and encapsulating the alkaline material in a slurry or gel form or a sheet formed by molding a mixture of the alkaline material in a powder form and a resin. The material that can physically adsorb and detoxify a hydrogen sulfide gas is, for example, activated carbon or silica gel.

In addition, as the material for the hydrogen sulfide eliminator 120, for example, a metal oxide-based material can be used. The metal oxide-based material is, for example, an oxide (or mixture with hydroxide) of a transition metal (such as manganese, copper, cobalt, zinc, or nickel). The hydrogen sulfide eliminator 120 may include a member (e.g., zeolite) for supporting the metal oxide-based material.

As the material for the hydrogen sulfide eliminator 120, for example, a generally known material for a gas absorption can for gas mask can be used.

The sulfur-based material contained in the power generating element 200 may be, for example, a sulfide-based solid electrolyte.

In such a case, the hydrogen sulfide eliminator 120 eliminates the hydrogen sulfide gas generated by a reaction of the sulfide-based solid electrolyte and, for example, outside air (e.g., water contained in the outside air infiltrated into the inside of the outer packaging 100 or water infiltrated into the inside of the outer packaging 100).

The power generating element 200 may be, for example, a battery module including a plurality of battery cells (e.g., single battery cells).

Alternatively, the power generating element 200 may be, for example, a battery pack including a plurality of the battery modules.

The structure described above can efficiently eliminate and detoxify hydrogen sulfide, which may be generated by abnormality of a battery, in units of battery module or battery pack. Furthermore, it is possible to keep the decrease in volume energy density to the minimum.

The battery cell included in the power generating element 200 may contain a sulfur-based material. For example, the battery cell included in the power generating element 200 may be an all-solid-state battery cell containing a sulfur-based solid electrolyte. In such a case, the battery 1000 in Embodiment 1 may be an all-solid-state battery including the all-solid-state battery cell (e.g., all-solid-lithium secondary battery (storage battery)).

An example of the power generating element 200 will be shown in the description of a battery 1200 below.

The battery 1000 in Embodiment 1 includes a first electrode terminal 410 and a second electrode terminal 420.

As shown in FIGS. 1 and 2, the first electrode terminal 410 may have an end included in the inside of the outer packaging 100 and an end exposing to the outside of the outer packaging 100. In such a case, the end included in the inside of the outer packaging 100 may be electrically connected to the first electrode of the power generating element 200.

As shown in FIGS. 1 and 2, the second electrode terminal 420 may have an end included in the inside of the outer packaging 100 and an end exposing to the outside of the outer packaging 100. In such a case, the end included in the inside of the outer packaging 100 may be electrically connected to the second electrode of the power generating element 200.

In the battery 1000 in Embodiment 1, a sealant (e.g., resin) may be applied to the contact zone between the outer packaging 100 and the first electrode terminal 410 or the second electrode terminal 420 for bonding and sealing.

In the battery 1000 in Embodiment 1, as shown in FIGS. 1 and 2, one end of the first electrode terminal 410 and one end of the second electrode terminal 420 may be exposed (e.g., drawn) from the same side face of the outer packaging 100.

Alternatively, one end of the first electrode terminal 410 and one end of the second electrode terminal 420 may be exposed (e.g., drawn) from different side faces of the outer packaging 100.

In the battery 1000 in Embodiment 1, as shown in FIGS. 1 and 2, the communicating port 110 may be disposed on the same side face of the outer packaging 100 as the side face from which the first electrode terminal 410 or the second electrode terminal 420 is exposed.

Alternatively, in the battery 1000 in Embodiment 1, the communicating port 110 may be disposed on a side face of the outer packaging 100 different from the side face from which the first electrode terminal 410 or the second electrode terminal 420 is exposed.

One end of the first electrode terminal 410 may be electrically connected to the positive electrode of the power generating element 200. In such a case, one end of the second electrode terminal 420 may be electrically connected to the negative electrode of the power generating element 200. In such a case, the first electrode terminal 410 functions as a positive electrode terminal, and the second electrode terminal 420 functions as a negative electrode terminal.

Alternatively, one end of the first electrode terminal 410 may be electrically connected to the negative electrode of the power generating element 200. In such a case, one end of the second electrode terminal 420 may be electrically connected to the positive electrode of the power generating element 200. In such a case, the first electrode terminal 410 functions as a negative electrode terminal, and the second electrode terminal 420 functions as a positive electrode terminal.

An example of the relations of connection between the power generating element 200 and the first electrode terminal 410 and connection between the power generating element 200 and the second electrode terminal 420 will be shown in the description of a battery 1200 below.

Figure 3:
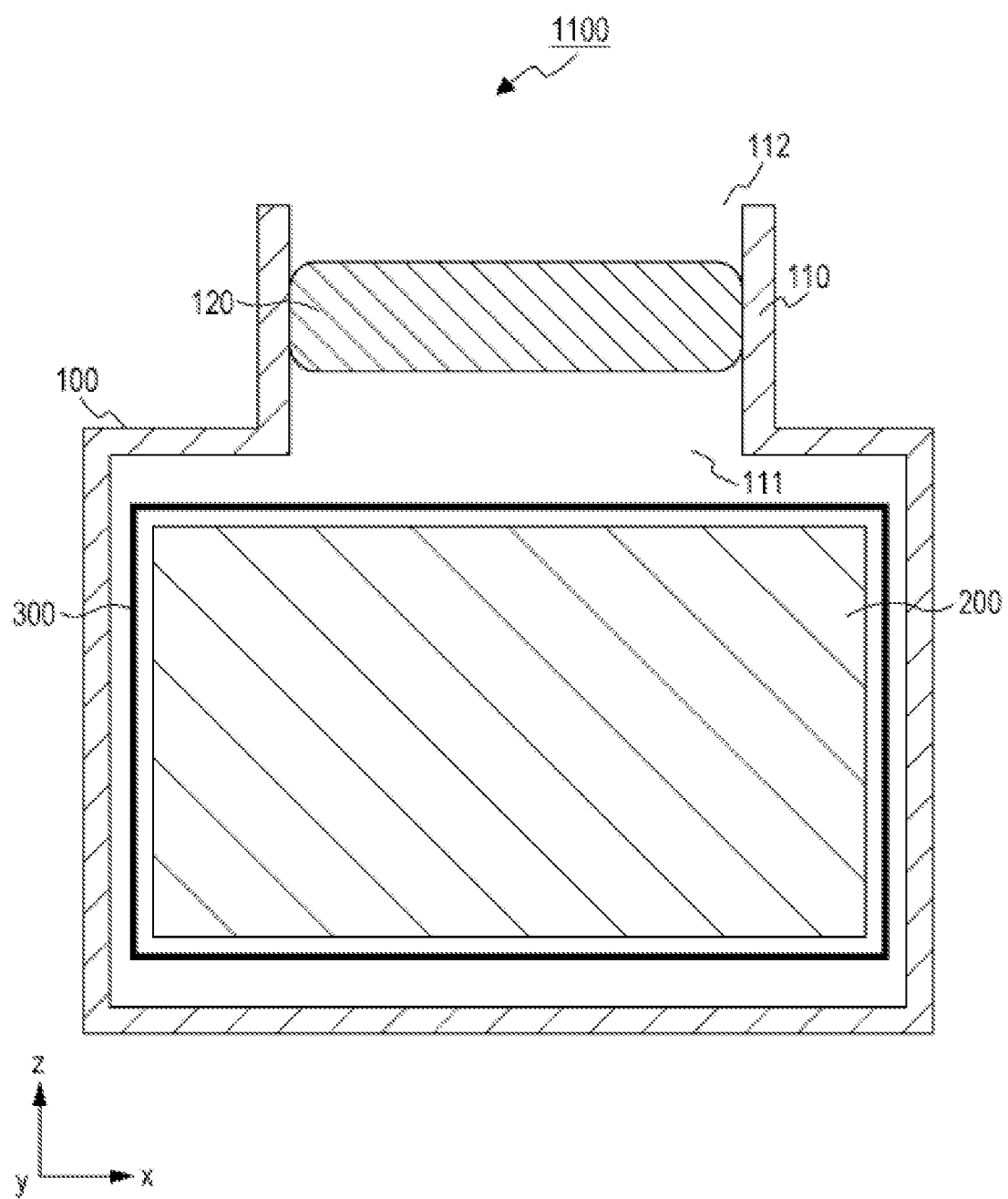
FIG. 3 is a cross-sectional view schematically illustrating the structure of another battery in Embodiment 1.

FIG. 3 is a cross-sectional view schematically illustrating the structure of a battery 1100 in Embodiment 1.

The battery 1100 in Embodiment 1 further includes the following structure in addition to the structure of the battery 1000 in Embodiment 1.

That is, the battery 1100 in Embodiment 1 further includes a housing 300.

The power generating element 200 is sealed and included in the housing 300.

The housing 300 is included in the outer packaging 100.

The structure described above can prevent the power generating element 200 from being in contact with, for example, the outside air. As a result, generation of hydrogen sulfide can be further prevented.

In Embodiment 1, the housing 300 may be a battery housing (e.g., battery case) having a shape, such as a laminate, square, cylindrical, or coin shape.

In Embodiment 1, the material constituting the housing 300 may be a generally known material for battery housings (e.g., battery cases).

Figure 4:
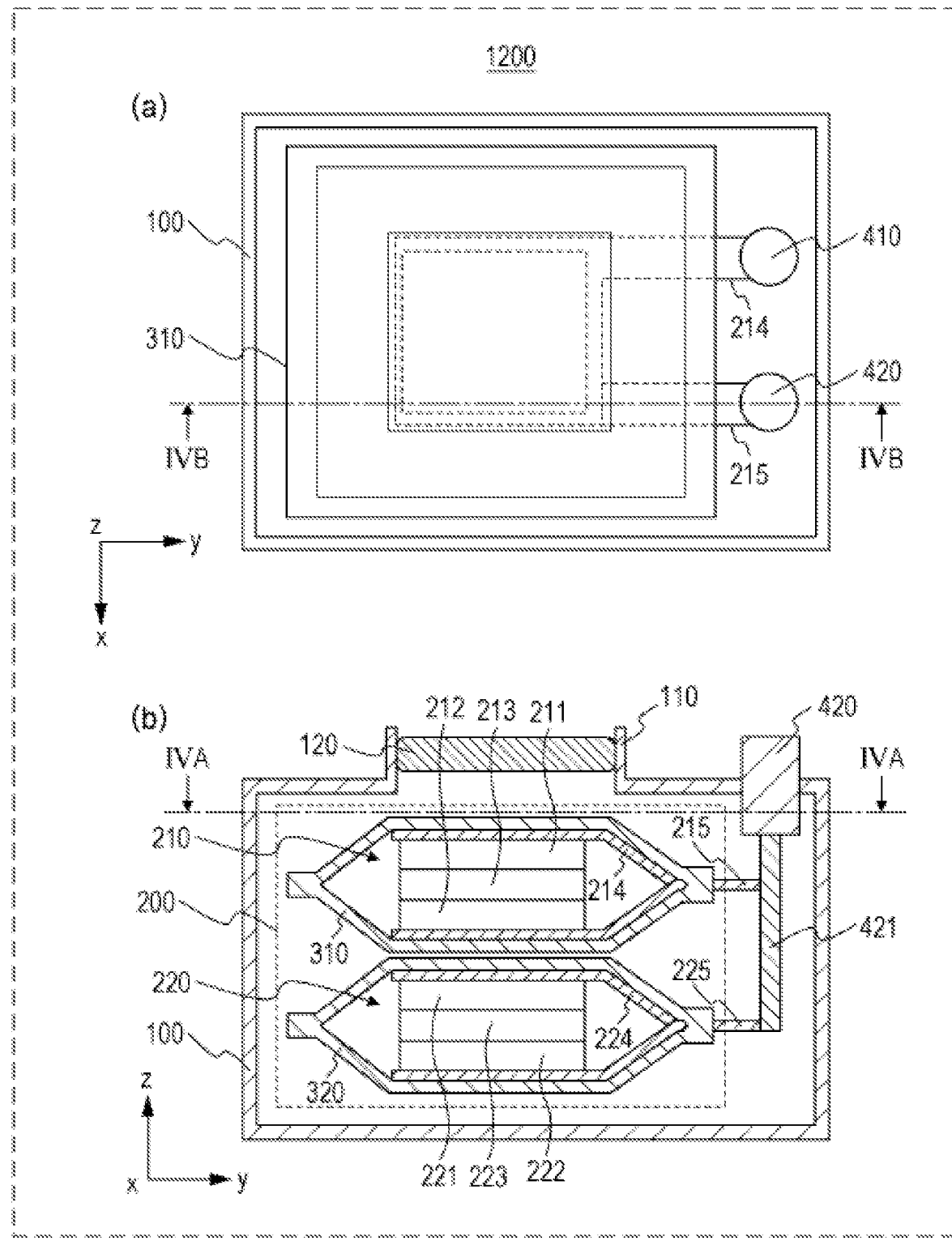
FIG. 4 includes diagrams schematically illustrating the structure of another battery in Embodiment 1.

FIG. 4 includes diagrams schematically illustrating the structure of a battery 1200 in Embodiment 1.

FIG. 4(*a*) is an x-y view (IVA-IVA cross-sectional view) schematically illustrating the structure of the battery 1200 in Embodiment 1.

FIG. 4(*b*) is a y-z view (IVB-IVB cross-sectional view) schematically illustrating the structure of the battery 1200 in Embodiment 1.

The battery 1200 in Embodiment 1 further includes the following structure in addition to the structure of the battery 1000 in Embodiment 1.

That is, in the battery 1200 in Embodiment 1, the power generating element 200 includes a first power generating element 210 and a second power generating element 220.

The first power generating element 210 and the second power generating element 220 each contain a sulfur-based material.

The first power generating element 210 and the second power generating element 220 are included in the outer packaging 100.

In the structure described above, the first power generating element 210 and the second power generating element 220 are each not required to be provided with the hydrogen sulfide eliminator 120. Accordingly, the first power generating element 210 and the second power generating element 220 can each avoid an increase in the thickness or volume due to the hydrogen sulfide eliminator 120. Thus, hydrogen sulfide can be detoxified by the hydrogen sulfide eliminator 120 disposed to the outer packaging 100, without decreasing the volume energy densities of the first power generating element 210 and the second power generating element 220.

The first power generating element 210 and the second power generating element 220 in Embodiment 1 are, for example, power generating parts (e.g., single battery cells) having charge and discharge characteristics.

The first power generating element 210 includes a first positive electrode layer 211, a first negative electrode layer 212, a first electrolyte layer 213, a first positive electrode current collector 214, and a first negative electrode current collector 215.

The first electrolyte layer 213 is disposed between the first positive electrode layer 211 and the first negative electrode layer 212.

The first positive electrode current collector 214 is in contact with the first positive electrode layer 211.

The first negative electrode current collector 215 is in contact with the first negative electrode layer 212.

At least one of the first positive electrode layer 211, the first negative electrode layer 212, and the first electrolyte layer 213 contains a sulfur-based material.

The second power generating element 220 includes a second positive electrode layer 221, a second negative electrode layer 222, a second electrolyte layer 223, a second positive electrode current collector 224, and a second negative electrode current collector 225.

The second electrolyte layer 223 is disposed between the second positive electrode layer 221 and the second negative electrode layer 222.

The second positive electrode current collector 224 is in contact with the second positive electrode layer 221.

The second negative electrode current collector 225 is in contact with the second negative electrode layer 222.

At least one of the second positive electrode layer 221, the second negative electrode layer 222, and the second electrolyte layer 223 contains a sulfur-based material.

The first positive electrode layer 211 and the second positive electrode layer 221 each contain, for example, a material for charge and discharge of the positive electrode (e.g., positive electrode active material). In such a case, the positive electrode layer may be a positive electrode mixture layer containing a positive electrode active material and, for example, a conductive assistant, a binding agent, and a solid electrolyte (e.g., a sulfide-based solid electrolyte serving as the sulfur-based material).

The positive electrode active material may be, for example, a material that occludes and releases metal ions. The positive electrode active material may be, for example, a material that occludes and releases lithium ions. Examples of the positive electrode active material include lithium-containing transition metal oxides, transition metal fluorides, polyanion and fluorinated polyanion materials, and transition metal sulfides.

The first negative electrode layer 212 and the second negative electrode layer 222 each contain, for example, a material for charge and discharge of the negative electrode (e.g., negative electrode active material). In such a case, the negative electrode layer may be a negative electrode mixture layer containing a negative electrode active material and, for example, a conductive assistant, a binding agent, and a solid electrolyte (e.g., a sulfide-based solid electrolyte serving as the sulfur-based material).

The negative electrode active material may be, for example, a material that occludes and releases metal ions. The negative electrode active material may be, for example, a material that occludes and releases lithium ions. Examples of the negative electrode active material include lithium metals, metals or alloys showing alloying reactions with lithium, carbons, transition metal oxides, and transition metal sulfides. Examples of the carbon include graphite and non-graphite carbon, such as hard carbon and coke. Examples of the transition metal oxide include CuO and NiO. Examples of the transition metal sulfide include copper sulfide represented by CuS. Examples of the metal or alloy showing an alloying reaction with lithium include silicon compounds, tin compounds, and alloys of an aluminum compound and lithium.

The first electrolyte layer 213 and the second electrolyte layer 223 each contain, for example, an electrolyte material (e.g., solid electrolyte). The solid electrolyte can be, for example, an organic solid electrolyte or an inorganic solid electrolyte (e.g., a sulfide-based solid electrolyte or oxide-based solid electrolyte). In such a case, the first power generating element 210 and the second power generating element 220 are constituted as solid battery cells. The first electrolyte layer 213 and the second electrolyte layer 223 may contain, for example, a conductive assistant and a binding agent, in addition to the electrolyte material.

The first electrolyte layer 213 and the second electrolyte layer 223 may contain a sulfide-based solid electrolyte as the sulfur-based material. The first electrolyte layer 213 and the second electrolyte layer 223 containing a sulfide-based solid electrolyte can have high ion conductivity. Examples of the sulfide-based solid electrolyte include $Li_2S$—$SiS_2$-based glass and glass ceramics, $Li_2S$—$B_2S_3$-based glass and glass ceramics, $Li_2S$—$P_2S_5$-based glass and glass ceramics, $Li_{3.25}Ge_{0.25}P_{0.75}S_4$, and $Li_{10}GeP_2S_{12}$; and those prepared by adding additives, such as LiI and $Li_xMO_y$ (M: P, Si, Ge, B, Al, Ga or In, x and y: integers), thereto.

The first positive electrode current collector 214 and the second positive electrode current collector 224 each can be, for example, a porous or nonporous sheet or film made of a metal material, such as aluminum, stainless steel, titanium, or an alloy thereof. The sheet or film may be, for example, metal foil or mesh.

The first negative electrode current collector 215 and the second negative electrode current collector 225 each can be, for example, a porous or nonporous sheet or film made of a metal material, such as stainless steel, nickel, copper, or an alloy thereof. The sheet or film may be, for example, metal foil or mesh.

The first power generating element 210 and the second power generating element 220 may each have a structure, such as a laminated, wrapped, or zigzag structure.

As shown in FIG. 4, the first power generating element 210 and the second power generating element 220 may each include one laminate composed of laminated positive electrode, negative electrode, and electrolyte layers.

Alternatively, the first power generating element 210 and the second power generating element 220 may each include two or more laminates each composed of laminated positive electrode, negative electrode, and electrolyte layers.

The first power generating element 210 and the second power generating element 220 may be made of the same material and have the same structure or may be made of different materials or have different structures.

The battery 1200 in Embodiment 1 further includes a first housing 310 and a second housing 320.

The first power generating element 210 is sealed and included in the first housing 310.

The second power generating element 220 is sealed and included in the second housing 320.

The first housing 310 and the second housing 320 are included in the outer packaging 100.

The structure described above can prevent the first power generating element 210 and the second power generating element 220 from being in contact with, for example, the outside air. As a result, generation of hydrogen sulfide can be further prevented.

In the battery 1200 in Embodiment 1, as shown in FIG. 4, the first housing 310 and the second housing 320 each may be a laminated case.

Alternatively, the first housing 310 and the second housing 320 each may be a battery case having a shape, such as a square, cylindrical, or coin shape.

The materials for the first housing 310 and the second housing 320 may be generally known materials for battery housings (e.g., battery cases).

The first housing 310 and the second housing 320 may be made of the same material and have the same structure or may be made of different materials or have different shapes.

The battery 1200 in Embodiment 1 may further include a first electrode lead 411 and a second electrode lead 421.

The first electrode lead 411 may connect between the first positive electrode current collector 214, the second positive electrode current collector 224, and the first electrode terminal 410. In such a case, the first electrode terminal 410 functions as a positive electrode terminal.

The second electrode lead 421 may connect between the first negative electrode current collector 215, the second negative electrode current collector 225, and the second electrode terminal 420. In such a case, the second electrode terminal 420 functions as a negative electrode terminal.

In the structure described above, the first power generating element 210 and the second power generating element 220 can be connected in parallel to each other. As a result, a module having a large capacity can be constituted.

The battery 1200 in Embodiment 1 may further include an electrode-connecting lead.

The electrode-connecting lead may connect between the first negative electrode current collector 215 and the second positive electrode current collector 224.

In such a case, the first electrode lead 411 may be connected to the first positive electrode current collector 214. In such a case, the first electrode terminal 410 functions as a positive electrode terminal.

Furthermore, the second electrode lead 421 may be connected to the second negative electrode current collector 225. In such a case, the second electrode terminal 420 functions as a negative electrode terminal.

In the structure described above, the first power generating element 210 and the second power generating element 220 are connected in series to each other. As a result, a high voltage module can be constituted.

In Embodiment 1, as shown in FIG. 4, the first power generating element 210 and the second power generating element 220 may be arranged so as to be stacked (laminated) to each other.

Alternatively, the first power generating element 210 and the second power generating element 220 may be arranged not to overlap each other (not to be laminated to each other).

In Embodiment 1, the power generating element 200 may further include another battery cell, in addition to the first power generating element 210 and the second power generating element 220. That is, in Embodiment 1, the power generating element 200 may include three or more battery cells.

Embodiment 2

Embodiment 2 will now be described. The same explanation as that in Embodiment 1 is appropriately omitted.

Figure 5:
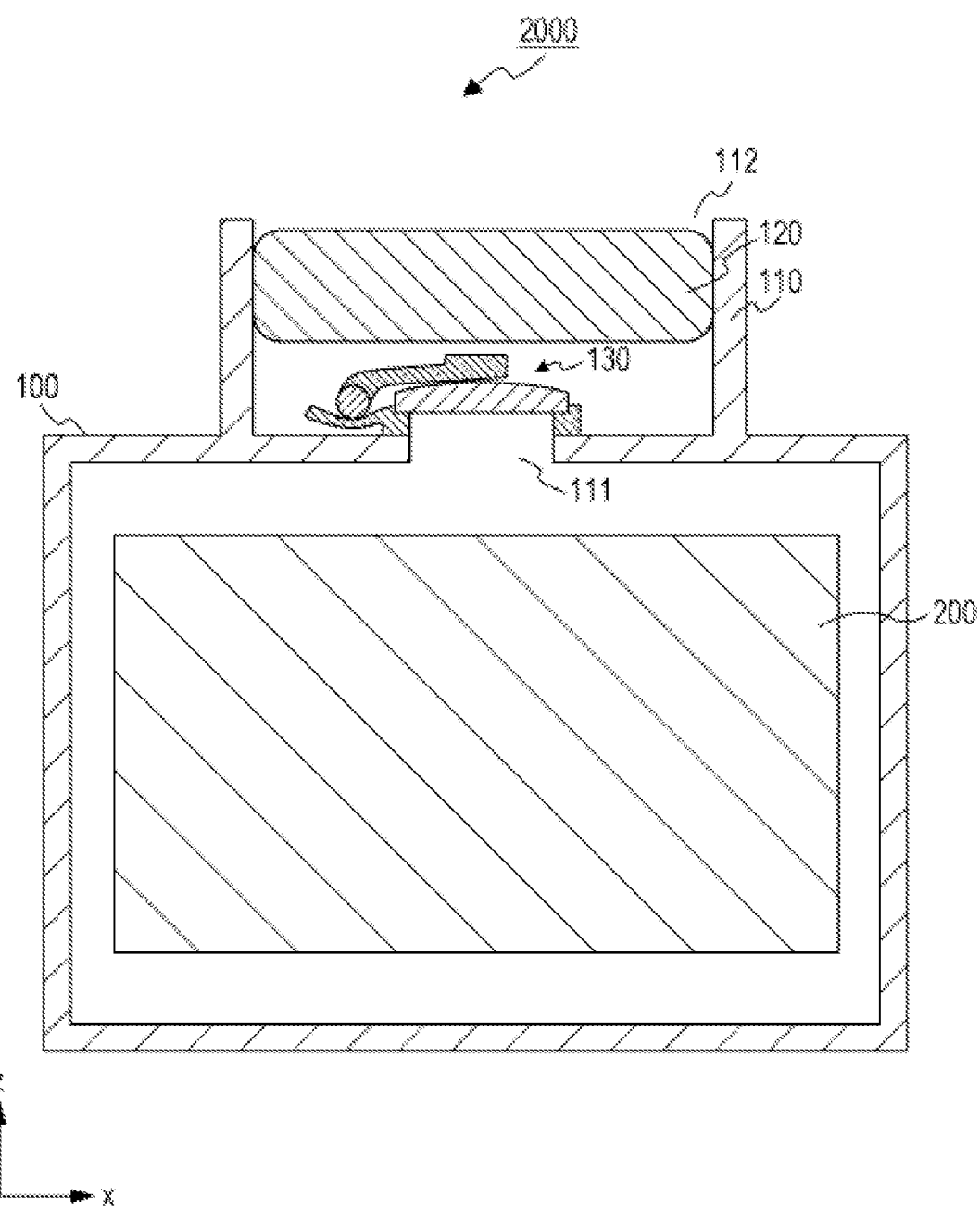
FIG. 5 is a cross-sectional view schematically illustrating the structure of a battery in Embodiment 2.

FIG. 5 is a cross-sectional view schematically illustrating the structure of a battery 2000 in Embodiment 2.

The battery 2000 in Embodiment 2 further includes the following structure in addition to the structure of the battery in Embodiment 1.

That is, in the battery 2000 in Embodiment 2, the communicating port 110 further includes a check valve 130.

The check valve 130 is opened when hydrogen sulfide is generated to increase the internal pressure in the inside of the outer packaging 100.

The structure described above can prevent inflow of, for example, outside air, into the inside of the outer packaging 100. Accordingly, the power generating element 200 can be prevented from being in contact with, for example, outside air. As a result, occurrence of hydrogen sulfide can be further prevented.

In the battery 2000 in Embodiment 2, the check valve 130 is, for example, a valve that can be opened to the outside of the outer packaging 100 and cannot be opened to the inside of the outer packaging 100.

The check valve 130 may be an arm-type check valve composed of an arm and a valve element as shown in FIG. 5. Alternatively, the check valve 130 may be another generally known check valve (e.g., poppet-type, swing-type, wafer-type. lift-type, ball-type, or foot-type).

In the battery 2000 in Embodiment 2, as shown in FIG. 5, the check valve 130 may be disposed on the inside opening 111 side of the communicating port 110.

In such a case, the hydrogen sulfide eliminator 120 may be disposed on the outside opening 112 side of the communicating port 110.

In the structure described above, the hydrogen sulfide eliminator 120 is disposed in the outside of the outer packaging 100 to readily perform the maintenance of the hydrogen sulfide eliminator 120. For example, inspection or replacement of the hydrogen sulfide eliminator 120 can be readily performed without detaching the outer packaging 100 or the check valve 130.

Furthermore, in the structure described above, only the hydrogen sulfide contained in the gas released, while expanding the check valve 130, from the inside of the outer packaging 100, among the hydrogen sulfide generated in the inside of the outer packaging 100, can be selectively introduced into the hydrogen sulfide eliminator 120. Accordingly, the amount of the hydrogen sulfide introduced into the hydrogen sulfide eliminator 120 can be reduced. As a result, it is possible to decrease the speed of deterioration of the hydrogen sulfide eliminator 120 due to elimination (e.g., absorption) of hydrogen sulfide.

Furthermore, in the structure described above, the hydrogen sulfide eliminator 120 is disposed on a side face in the outside of the outer packaging 100 and can have an area larger than the area of the side face of the outer packaging 100 (or the same as the area of the side face of the outer packaging 100). In other words, an increase in the size of the inside of the battery included in the outer packaging 100 by disposing the hydrogen sulfide eliminator 120 can be prevented. That is, the hydrogen sulfide eliminator 120 can be disposed as a larger member on a side face in the outside of the outer packaging 100, without increasing the size of the inside of the battery included in the outer packaging 100. Accordingly, hydrogen sulfide can be more certainly eliminated by a larger hydrogen sulfide eliminator 120.

In Embodiment 2, the inside of the outer packaging 100 may be sealed with the outer packaging 100 and the check valve 130. That is, the outer packaging 100 may have a structure not provided with any opening communicating with the outside of the outer packaging 100 except for the communicating port 110 (check valve 130).

The structure described above can further prevent inflow of, for example, outside air into the inside of the outer packaging 100. Accordingly, the power generating element 200 can be further prevented from being in contact with, for example, outside air. As a result, generation of hydrogen sulfide can be further prevented.

Figure 6:
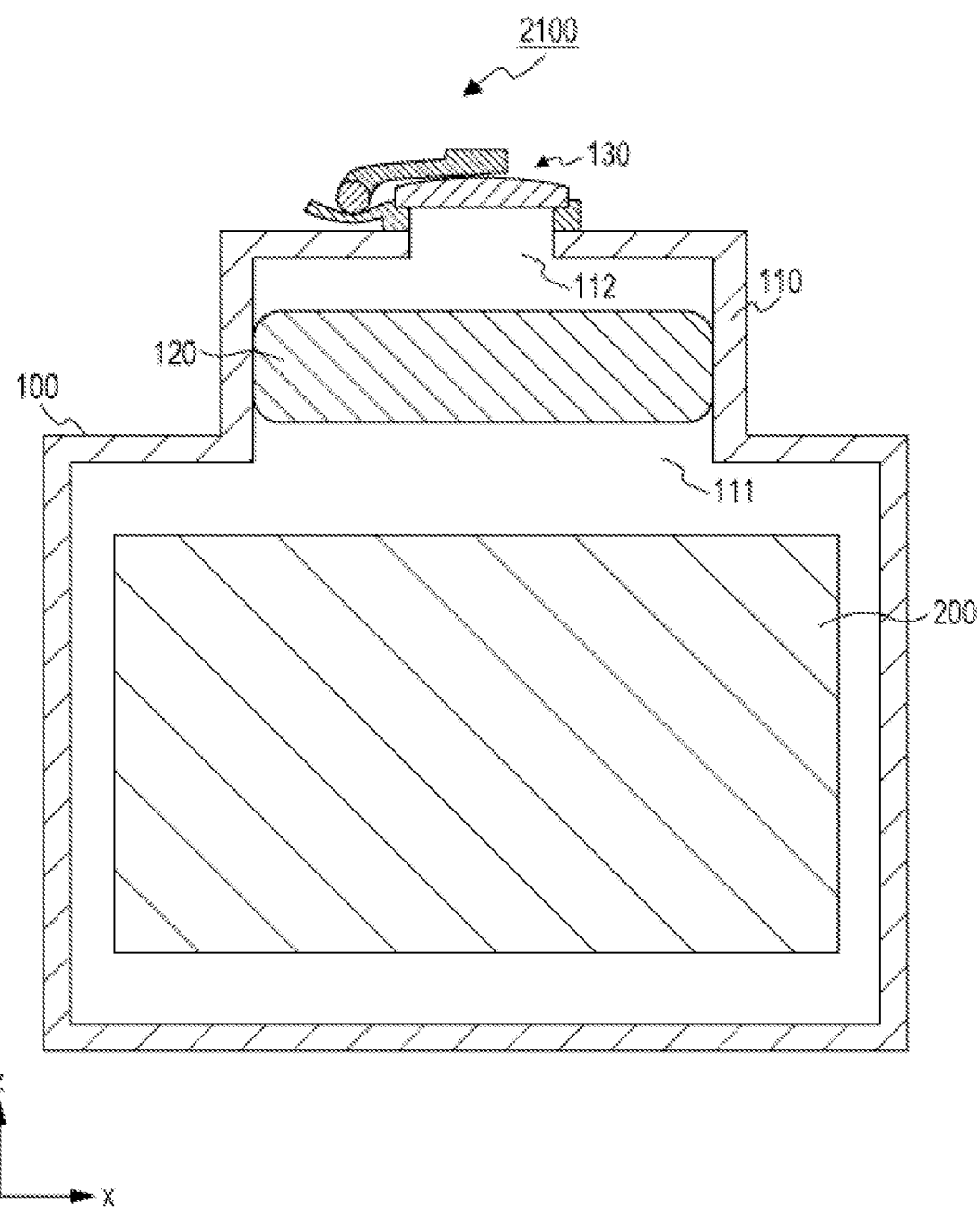
FIG. 6 is a cross-sectional view schematically illustrating the structure of another battery in Embodiment 2.

FIG. 6 is a cross-sectional view schematically illustrating the structure of a battery 2100 in Embodiment 2.

The battery 2100 in Embodiment 2 further includes the following structure in addition to the structure of the battery in Embodiment 1.

That is, in the battery 2100 in Embodiment 2, the check valve 130 is disposed on the outside opening 112 side of the communicating port 110.

In such a case, the hydrogen sulfide eliminator 120 is disposed on the inside opening 111 side of the communicating port 110.

In the structure described above, the hydrogen sulfide eliminator 120 can be disposed in the space sealed by the outer packaging 100 and the check valve 130. As a result, the hydrogen sulfide eliminator 120 can be prevented from being in contact with, for example, outside air. As a result, the hydrogen sulfide eliminator 120 can be prevented from deteriorating (e.g., deterioration with time) due to, for example, outside air.

Embodiment 3

Embodiment 3 will now be described. The same explanation as that in Embodiment 1 or Embodiment 2 is appropriately omitted.

Figure 7:
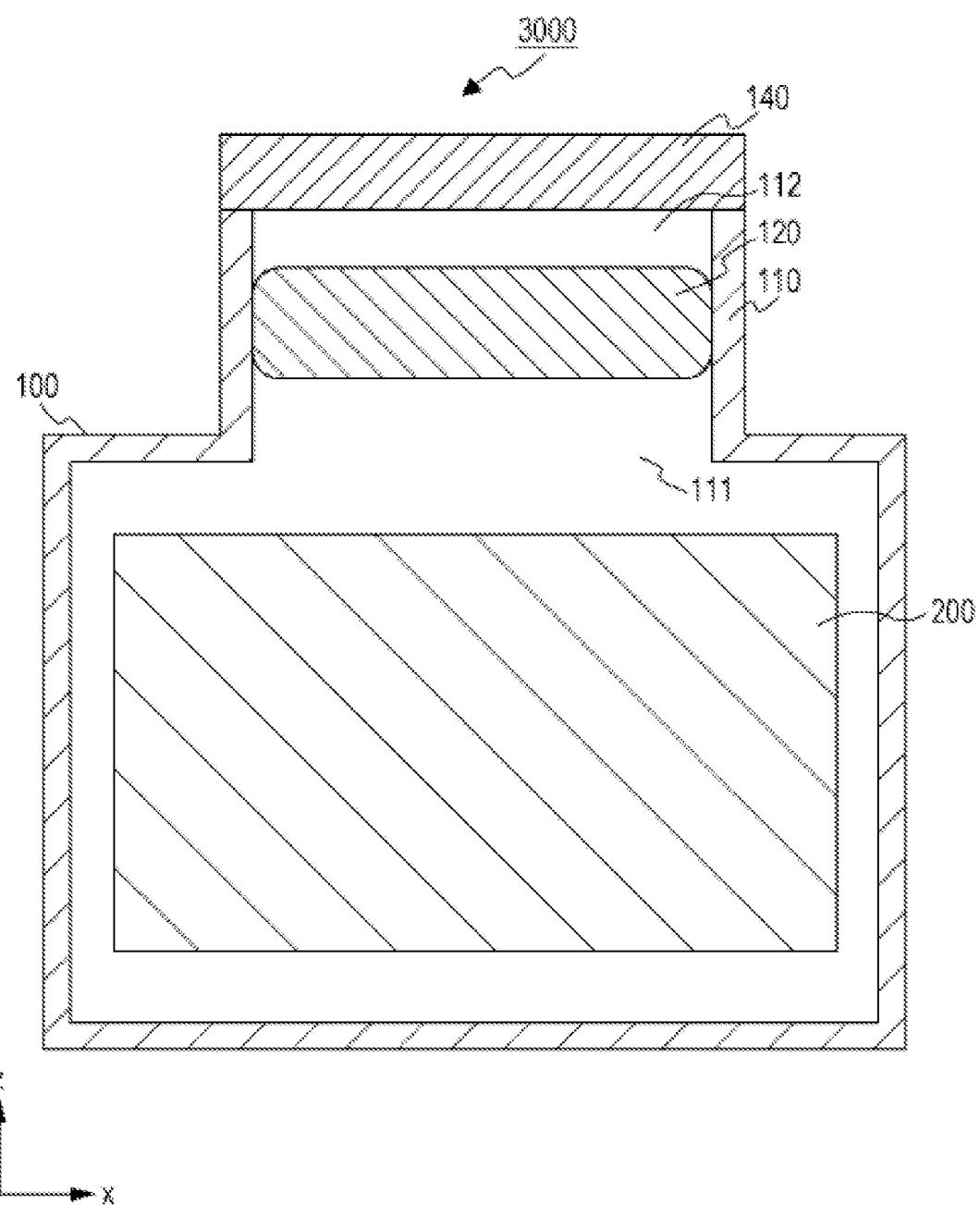
FIG. 7 is a cross-sectional view schematically illustrating the structure of a battery in Embodiment 3.

FIG. 7 is a cross-sectional view schematically illustrating the structure of a battery 3000 in Embodiment 3.

The battery 3000 in Embodiment 3 further includes the following structure in addition to the structure of the battery in Embodiment 1.

That is, in the battery 3000 in Embodiment 3, the outer packaging 100 further includes an exhausting unit 140.

The exhausting unit 140 is disposed in the communicating port 110.

The exhausting unit 140 introduces hydrogen sulfide to the communicating port 110. In other words, hydrogen sulfide is introduced to the communicating port 110 by the operation of the exhausting unit 140.

In the structure described above, hydrogen sulfide can be forcibly introduced to the communicating port 110 having the hydrogen sulfide eliminator 120 by the exhausting unit 140. For example, even if an opening (e.g., a hole or crack formed by, for example, mechanical shock) is formed in the outer packaging 100 at a position different from the position at which the communicating port 110 is located, the exhausting unit 140 can introduce hydrogen sulfide to the communicating port 110 having the hydrogen sulfide eliminator 120, not to the opening. As a result, hydrogen sulfide can be introduced into the hydrogen sulfide eliminator 120, without being dispersed to other regions than the hydrogen sulfide eliminator 120. Consequently, the hydrogen sulfide eliminator 120 can more certainly eliminate hydrogen sulfide.

In the battery 3000 in Embodiment 3, the exhausting unit 140 may be disposed in the outside opening 112 of the communicating port 110.

In such a case, the hydrogen sulfide eliminator 120 may be disposed on the inside opening 111 side of the communicating port 110 than the exhausting unit 140.

In the structure described above, hydrogen sulfide can be more powerfully introduced by the exhausting unit 140 to the communicating port 110 having the hydrogen sulfide eliminator 120. As a result, the hydrogen sulfide eliminator 120 can more efficiently eliminate hydrogen sulfide.

In Embodiment 3, as the exhausting unit 140, a generally known exhaust equipment may be used.

Figure 8:
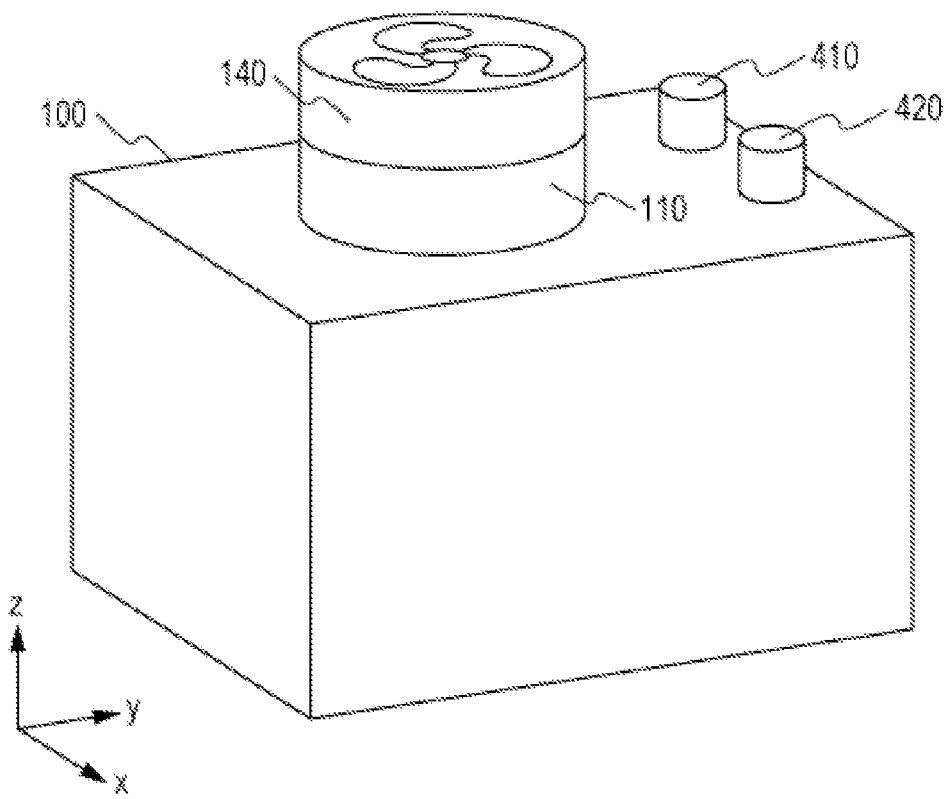
FIG. 8 is a perspective view schematically illustrating the structure of the battery in Embodiment 3.

FIG. 8 is a perspective view schematically illustrating the structure of the battery 3000 in Embodiment 3.

In Embodiment 3, as shown in FIG. 8, the exhausting unit 140 may be an exhaust fan.

The exhaust fan performs exhaust from the inside toward the outside of the outer packaging 100 by rotating the fan. As a result, if a hydrogen sulfide gas is present in the inside of the outer packaging 100, the hydrogen sulfide gas moves to (is introduced into) the communicating port 110 by the rotation of the exhaust fan.

As the exhaust fan, a generally known fan may be used.

Figure 9:
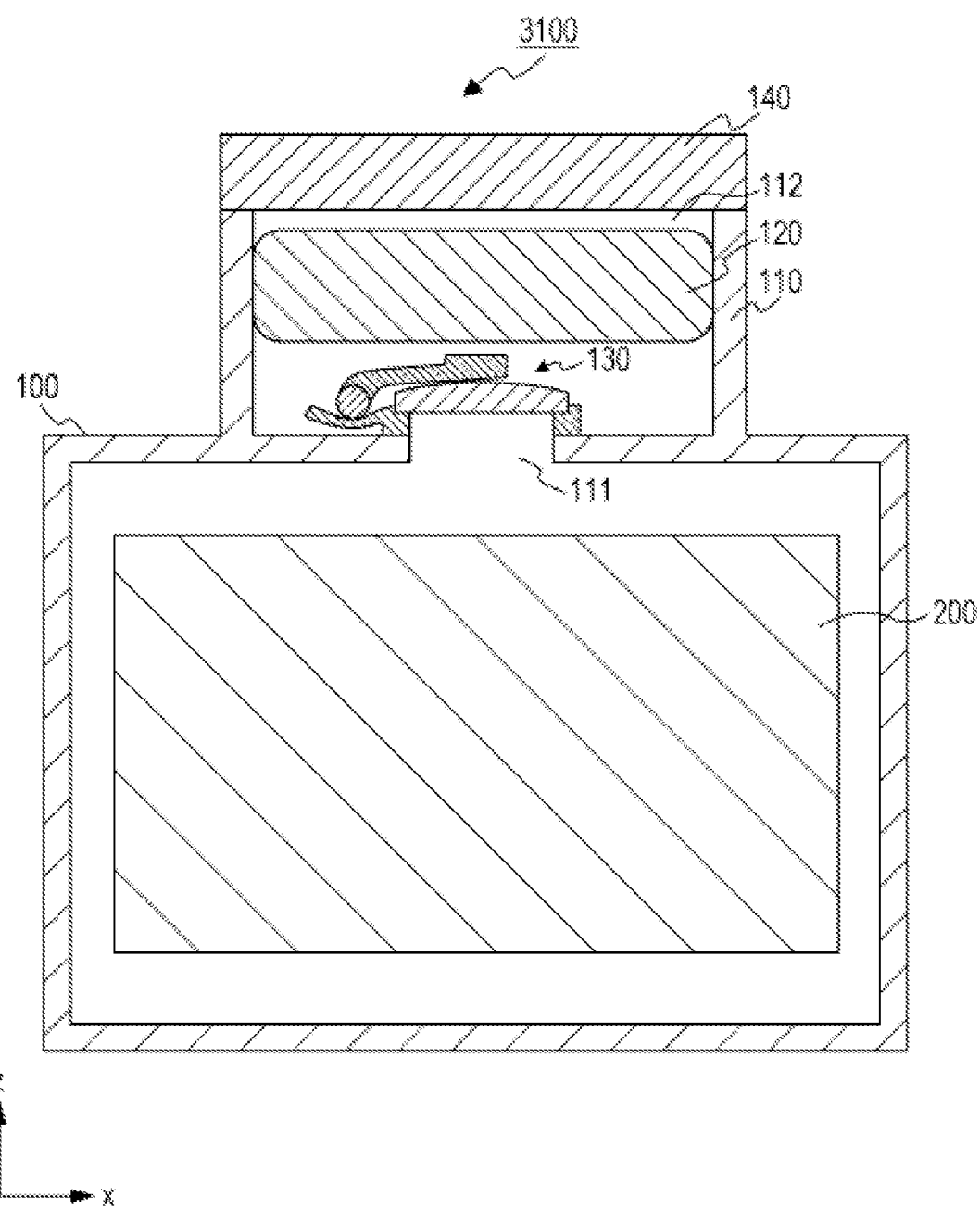
FIG. 9 is a cross-sectional view schematically illustrating the structure of another battery in Embodiment 3.

FIG. 9 is a cross-sectional view schematically illustrating the structure of a battery 3100 in Embodiment 3.

The battery 3100 in Embodiment 3 further includes the following structure in addition to the structure of the battery 3000 in Embodiment 3.

That is, in the battery 3100 in Embodiment 3, the communicating port 110 further includes a check valve 130.

In such a case, the check valve 130 is disposed on the inside opening 111 side of the communicating port 110.

The hydrogen sulfide eliminator 120 is disposed between the check valve 130 and the exhausting unit 140 in the communicating port 110.

In the structure described above, the hydrogen sulfide gas released, while expanding the check valve 130, from the inside of the outer packaging 100, among the hydrogen sulfide generated in the inside of the outer packaging 100, can be forcibly introduced into the hydrogen sulfide eliminator 120 by the exhausting unit 140.

The structures described in Embodiments 1 to 3 may be appropriately combined.

Embodiment 4

Embodiment 4 will now be described. The same explanation as that in any of Embodiments 1 to 3 is appropriately omitted.

Figure 10:
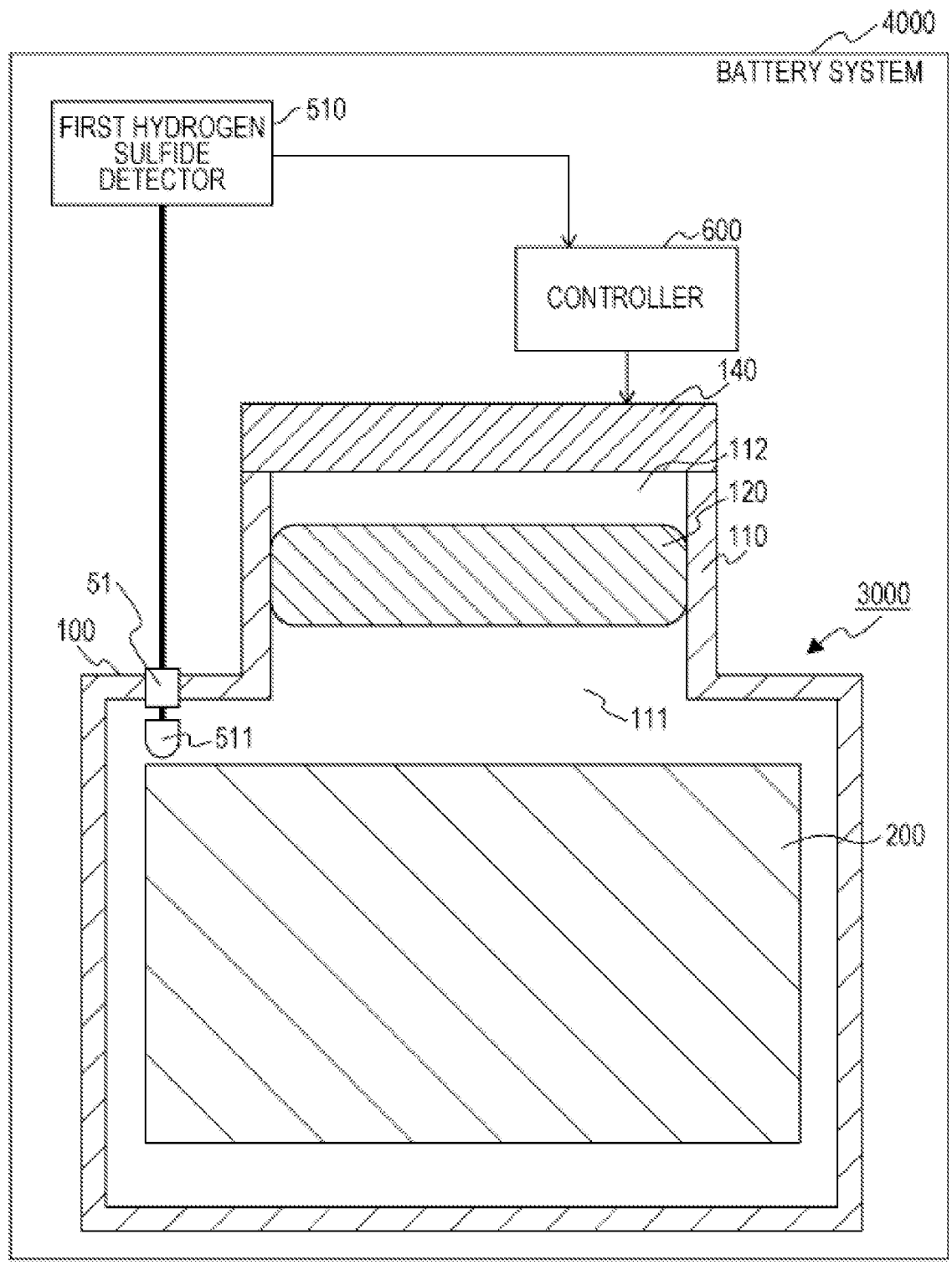
FIG. 10 is a diagram schematically illustrating the structure of a battery system in Embodiment 4.

FIG. 10 is a diagram schematically illustrating the structure of a battery system 4000 in Embodiment 4.

The battery 4000 in Embodiment 4 includes the battery 3000 in Embodiment 3, a first hydrogen sulfide detector 510 (i.e., first hydrogen sulfide detecting unit), and a controller 600 (i.e., control unit).

The first hydrogen sulfide detector 510 detects the presence of hydrogen sulfide.

The controller 600 controls the exhausting unit 140.

The first hydrogen sulfide detector 510 detects the presence of hydrogen sulfide in the inside of the outer packaging 100.

The first hydrogen sulfide detector 510 generates a first detection signal when hydrogen sulfide is present in the inside of the outer packaging 100.

The first detection signal is input into the controller 600.

The controller 600 controls the exhausting unit 140 according to the first detection signal.

The structure described above can more efficiently operate the exhausting unit 140. That is, for example, if hydrogen sulfide is detected in the inside of the outer packaging 100 when the exhausting unit 140 is in a stopped state, the exhausting unit 140 can be started to drive. Alternatively, if the concentration of hydrogen sulfide in the inside of the outer packaging 100 is not lower than a predetermined value (e.g., if the value of the first detection signal is a predetermined value or more) when the exhausting unit 140 is in a stopped state, the exhausting unit 140 can be started to drive. As a result, when hydrogen sulfide is generated in the inside of the outer packaging 100, the exhausting unit 140 can certainly and efficiently perform the introduction of hydrogen sulfide to the hydrogen sulfide eliminator 120 (elimination of hydrogen sulfide).

The battery 4000 in Embodiment 4 may further include a first sensor element 511.

As shown in FIG. 10, the first sensor element 511 is disposed in the inside of the outer packaging 100.

In such a case, the first hydrogen sulfide detector 510 may detect the presence of hydrogen sulfide in the inside of the outer packaging 100 based on the signal from the first sensor element 511.

As the first sensor element 511, generally known gas detection sensors (e.g., constant potential electrolysis type, semiconductor type, and thermal conductivity type) may be used alone or in combination of two or more thereof.

The first sensor element 511 may include a sensing region and a pair of connecting wires connected to the sensing region.

The connecting wire drawn to the outside of the outer packaging 100 is connected to the first hydrogen sulfide detector 510.

The sensing region of the first sensor element 511 may contain a resistance-variable material (e.g., a metal such as copper, nickel, or iron) that changes the electric resistance by a chemical reaction with hydrogen sulfide.

The first hydrogen sulfide detector 510 may detect, for example, the voltage between the pair of connecting wires by applying a current between the connecting wires. In such a case, the first hydrogen sulfide detector 510 may include, for example, a current applying unit (e.g., current source) and a voltage measuring unit (e.g., voltmeter). In such a case, the first detection signal generated by the first hydrogen sulfide detector 510 may be a signal correlated with the result of measurement by the voltage measuring unit. As the structure of the current applying unit and the voltage measuring unit, a generally known configuration can be used.

Alternatively, the first hydrogen sulfide detector 510 may detect, for example, the current between the pair of connecting wires by applying a voltage between the connecting wires. In such a case, the first hydrogen sulfide detector 510 may include, for example, a voltage applying unit (e.g., voltage source) and a current measuring unit (e.g., ammeter). In such a case, the first detection signal generated by the first hydrogen sulfide detector 510 may be a signal correlated with the result of measurement by the current measuring unit. As the structure of the voltage applying unit and the current measuring unit, a generally known configuration can be used.

The connecting wire may pass through a sealing part 51 provided to the outer packaging 100 and may be drawn to the outside of the outer packaging 100. The sealing part 51 may be made of a generally known sealing material (such as a thermoplastic resin, thermosetting resin, or photo-curing resin).

As described above, the first hydrogen sulfide detector 510 may have a structure including the first sensor element 511.

Alternatively, the first hydrogen sulfide detector 510 may have a structure including a communicating tube communicating with the inside of the outer packaging 100. In such a case, the first hydrogen sulfide detector 510 may detect hydrogen sulfide introduced from the inside of the outer packaging 100 through the communicating tube. In such a case, the first hydrogen sulfide detector 510 may be a generally known gas analyzer.

In Embodiment 4, the controller 600 may start and stop the exhausting unit 140 according to the first detection signal.

That is, for example, when the exhausting unit 140 includes an exhaust fan, the controller 600 may start or stop the rotation of the exhaust fan according to the first detection signal.

An example of the controlling process (method) in Embodiment 4 will now be described.

Figure 11:
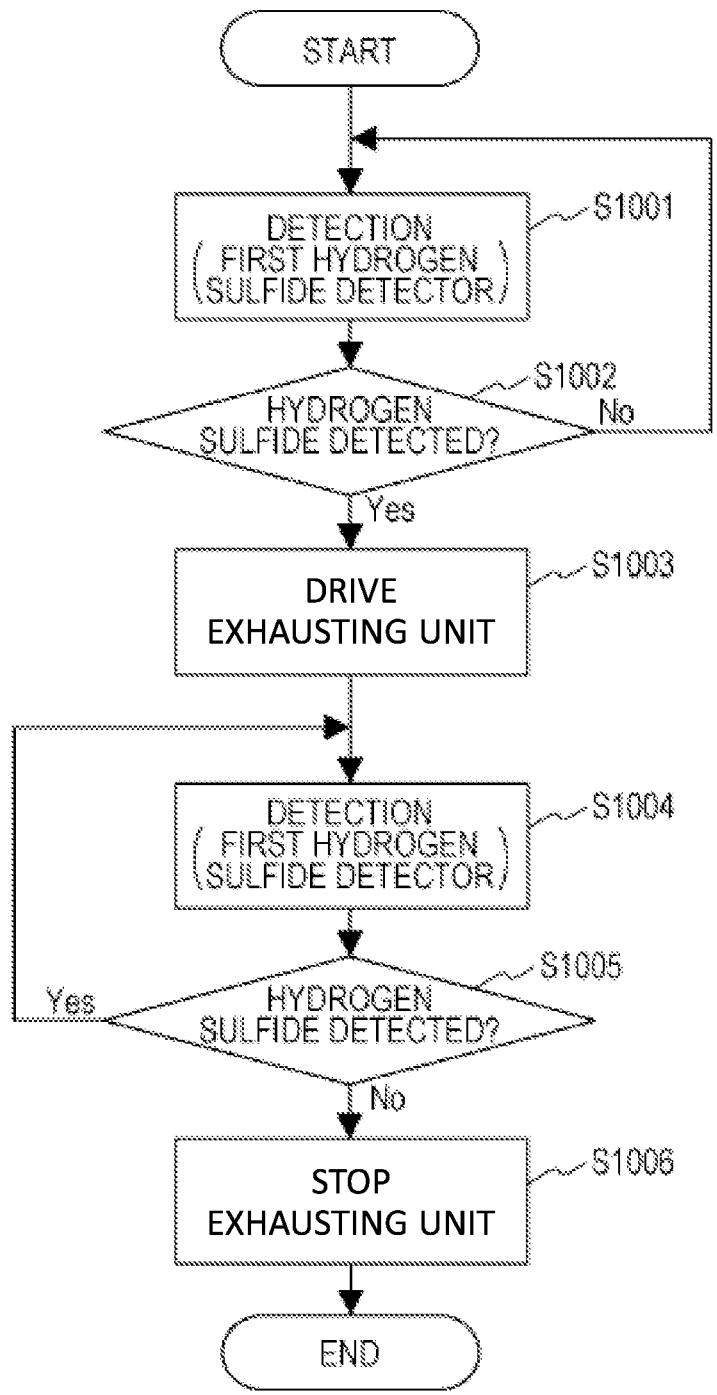
FIG. 11 is a flow chart showing an example of the controlling process in Embodiment 4.

FIG. 11 is a flow chart showing an example of the controlling process in Embodiment 4.

The controlling process in Embodiment 4 includes detection step S1001, decision step S1002, driving step S1003, detection step S1004, decision step S1005, and stopping step S1006.

Detection step S1001 detects the presence of hydrogen sulfide in the inside in the outer packaging 100 by the first hydrogen sulfide detector 510.

Decision step S1002 is carried out after detection step S1001. In decision step S1002, the controller 600 judges whether hydrogen sulfide is present in the inside of the outer packaging 100 or not, based on the signal from the first hydrogen sulfide detector 510.

If decision step S1002 does not detect the presence of hydrogen sulfide in the inside of the outer packaging 100 (when the first hydrogen sulfide detector 510 does not generate a first detection signal), detection step S1001 is performed again.

In contrast, if decision step S1002 detects the presence of hydrogen sulfide in the inside of the outer packaging 100 (when the first hydrogen sulfide detector 510 generates a first detection signal), driving step S1003 is performed.

Driving step S1003 is carried out after decision step S1002. In driving step S1003, the controller 600 drives the exhausting unit 140.

If driving step S1003 is performed when the exhausting unit 140 is in a stopped state, the exhausting unit 140 starts to be operated (for example, exhaust fan starts to rotate).

If driving step S1003 is performed when the exhausting unit 140 is in an operating state, the exhausting unit 140 is continuously operated (for example, the exhaust fan continues to rotate).

Detection step S1004 is carried out after driving step S1003. In detection step S1004, the first hydrogen sulfide detector 510 detects the presence of hydrogen sulfide in the inside of the outer packaging 100.

Decision step S1005 is carried out after detection step S1004. In decision step S1005, the controller 600 judges whether hydrogen sulfide is present in the inside of the outer packaging 100 or not, based on the signal from the first hydrogen sulfide detector 510.

If decision step S1005 detects the presence of hydrogen sulfide in the inside of the outer packaging 100 (when the first hydrogen sulfide detector 510 generates a first detection signal), detection step S1004 is performed again.

In contrast, if decision step S1005 does not detect the presence of hydrogen sulfide in the inside of the outer packaging 100 (when the first hydrogen sulfide detector 510 does not generate a first detection signal), stopping step S1006 is performed.

Stopping step S1006 is carried out after decision step S1005. In stopping step S1006, the controller 600 stops the exhausting unit 140 (for example, the rotation of the exhaust fan is stopped).

As described above, in the battery 4000 in Embodiment 4, the controller 600 may allow the exhausting unit 140 to operate during that the first detection signal is being input and may stop the exhausting unit 140 during that the first detection signal is not being input.

The structure described above allows the exhausting unit 140 not to operate during the exhausting unit 140 is not required to be driven (for example, when hydrogen sulfide is not detected or when the concentration of hydrogen sulfide is not higher than a predetermined concentration). Accordingly, the energy consumption for driving the exhausting unit 140 can be reduced. In addition, occurrence of, for example, trouble of the exhausting unit 140 by driving the exhausting unit 140 all the time can be prevented.

In the battery 4000 in Embodiment 4, the controller 600 may change the displacement (exhaust velocity) of the exhausting unit 140 according to the first detection signal.

That is, the controller 600 may increase the displacement of the exhausting unit 140 (or may increase the exhaust velocity (the rotation speed of the exhaust fan)) when the first detection signal is input. The controlling process may be replaced by driving step S1003.

If the input of the first detection signal is terminated, the exhausting unit 140 may reduce the displacement (or may decrease the exhaust velocity (rotation speed of the exhaust fan)). This controlling process may be replaced by stopping step S1006.

Figure 12:
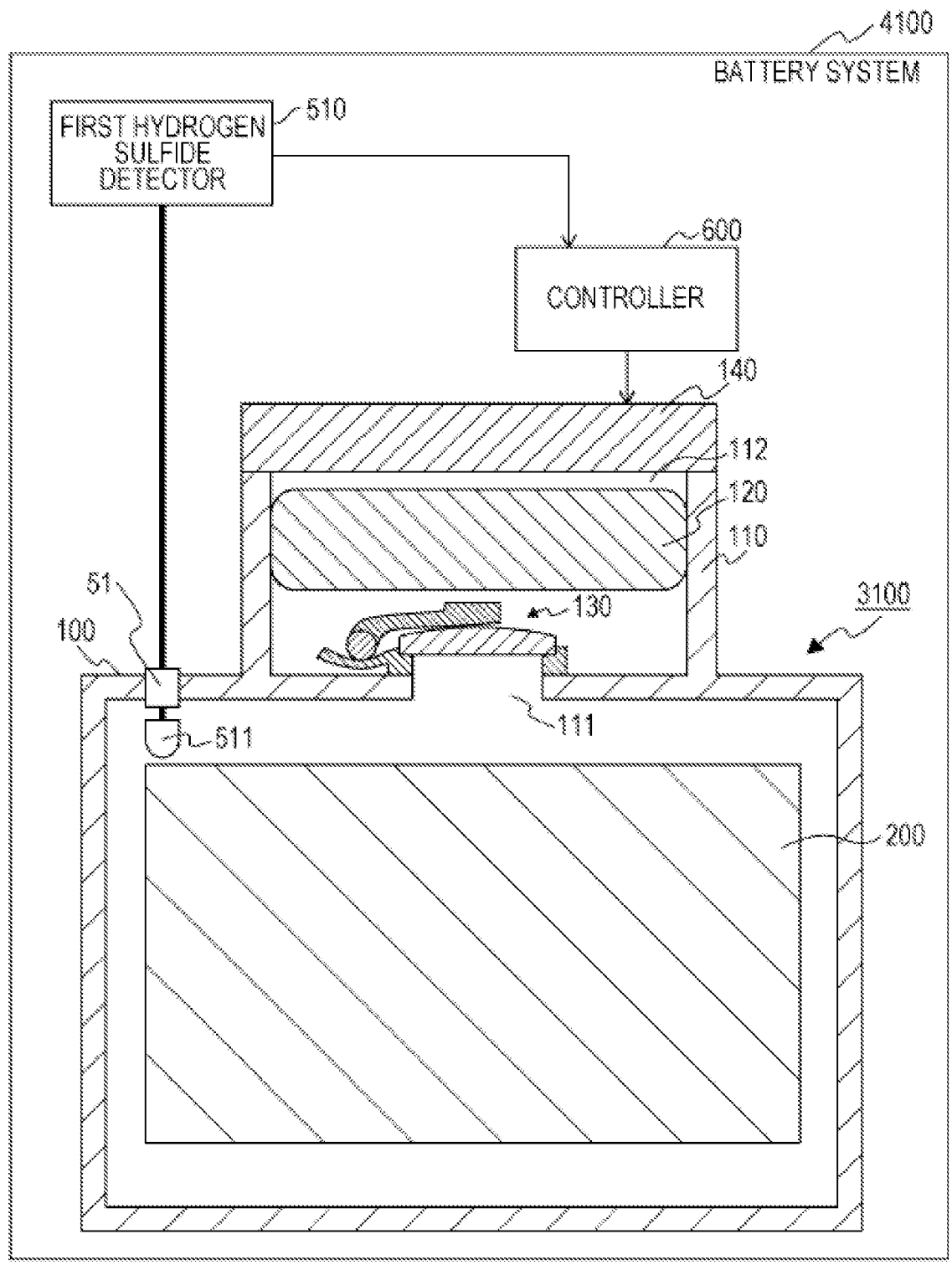
FIG. 12 is a diagram schematically illustrating the structure of another battery system in Embodiment 4.

FIG. 12 is a diagram schematically illustrating the structure of a battery system 4100 in Embodiment 4.

The battery system 4100 in Embodiment 4 includes the battery 3100 in Embodiment 3, a first hydrogen sulfide detector 510, a controller 600, and a first sensor element 511.

In the battery system 4100 in Embodiment 4, as shown in FIG. 12, the first sensor element 511 is disposed in the space surrounded by the outer packaging 100 and a check valve 130.

The structure described above can reduce the space as the target of detection by the first hydrogen sulfide detector 510. As a result, generation of hydrogen sulfide from the power generating element 200 causes a significant increase in the concentration of hydrogen sulfide in the space as the target of detection. Accordingly, the first hydrogen sulfide detector 510 can detect the generation of hydrogen sulfide from the power generating element 200 with higher precision.

Embodiment 5

Embodiment 5 will now be described. The same explanation as that in any of Embodiments 1 to 4 is appropriately omitted.

Figure 13:
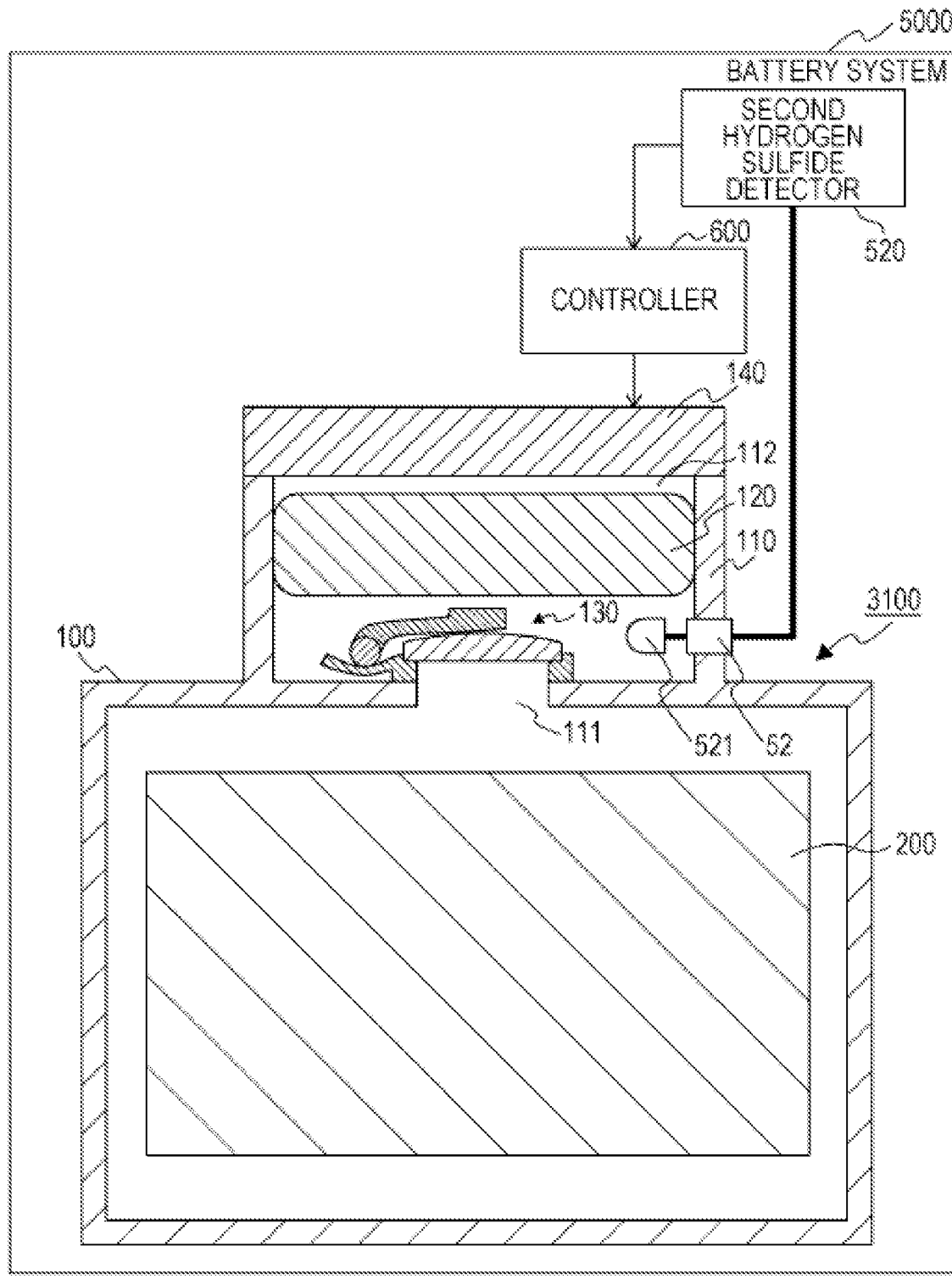
FIG. 13 is a diagram schematically illustrating the structure of a battery system in Embodiment 5.

FIG. 13 is a diagram schematically illustrating the structure of a battery system 5000 in Embodiment 5.

The battery system 5000 in Embodiment 5 includes the battery 3100 in Embodiment 3, a second hydrogen sulfide detector 520, and a controller 600.

The second hydrogen sulfide detector 520 (i.e., second hydrogen sulfide detecting unit) detects the presence of hydrogen sulfide.

The controller 600 controls the exhausting unit 140.

The second hydrogen sulfide detector 520 detects the presence of hydrogen sulfide on the outside opening 112 side than the check valve 130 in the communicating port 110.

The second hydrogen sulfide detector 520 generates a second detection signal when hydrogen sulfide is present on the outside opening 112 side than the check valve 130 in the communicating port 110.

The second detection signal is input into the controller 600.

The controller 600 controls the exhausting unit 140 according to the second detection signal.

The structure described above can more efficiently operate the exhausting unit 140. That is, for example, if hydrogen sulfide is detected on the outside opening 112 side than the check valve 130 when the exhausting unit 140 is in a stopped state, the exhausting unit 140 can be started to drive. Alternatively, if the concentration of hydrogen sulfide is not lower than a predetermined value (for example, the value of the second detection signal is a predetermined value or more) on the outside opening 112 side than the check valve 130 when the exhausting unit 140 is in a stopped state, the exhausting unit 140 can be started to drive. Accordingly, if hydrogen sulfide generated in the inside of the outer packaging 100 flows out to the outside opening 112 side than the check valve 130, the exhausting unit 140 can certainly and efficiently perform the introduction of hydrogen sulfide to the hydrogen sulfide eliminator 120 (elimination of hydrogen sulfide).

The battery system 5000 in Embodiment 5 may further include a second sensor element 521.

As shown FIG. 13, the second sensor element 521 is disposed on the outside opening 112 side than the check valve 130 in the communicating port 110 and may be disposed on the inside opening 111 side than the exhausting unit 140 and the hydrogen sulfide eliminator 120.

In such a case, the second hydrogen sulfide detector 520 may detect the presence of hydrogen sulfide on the outside opening 112 side than the check valve 130 in the communicating port 110 based on the signal from the second sensor element 521.

As the second sensor element 521, generally known gas detection sensors (e.g., constant potential electrolysis type, semiconductor type, and thermal conductivity type) may be used alone or in combination of two or more thereof.

The second sensor element 521 may include a sensing region and a pair of connecting wires connected to the sensing region.

The connecting wire drawn to the outside of the outer packaging 100 (the outside of the communicating port 110) is connected to the second hydrogen sulfide detector 520.

The sensing region of the second sensor element 521 may contain a resistance-variable material (e.g., a metal such as copper, nickel, or iron) that changes the electric resistance by a chemical reaction with hydrogen sulfide.

The second hydrogen sulfide detector 520 may detect, for example, the voltage between the pair of connecting wires by applying a current between the connecting wires. In such a case, the second hydrogen sulfide detector 520 may include, for example, a current applying unit (e.g., current source) and a voltage measuring unit (e.g., voltmeter). In such a case, the second detection signal generated by the second hydrogen sulfide detector 520 may be a signal correlated with the result of measurement by the voltage measuring unit. As the structure of the current applying unit and the voltage measuring unit, a generally known configuration can be used.

Alternately, the second hydrogen sulfide detector 520 may detect, for example, the current between the pair of connecting wires by applying a voltage between the connecting wires. In such a case, the second hydrogen sulfide detector 520 may include, for example, a voltage applying unit (e.g., voltage source) and a current measuring unit (e.g., ammeter). In such a case, the second detection signal generated by the first hydrogen sulfide detector 520 may be a signal correlated with the result of measurement by the current measuring unit. As the structure of the voltage applying unit and the current measuring unit, a generally known configuration can be used.

The connecting wire may pass through a sealing part 52 provided to the outer packaging 100 (communicating port 110) and may be drawn to the outside of the outer packaging 100 (communicating port 110). The sealing part 52 may be made of a generally known sealing material (such as a thermoplastic resin, thermosetting resin, or photo-curing resin).

As described above, the second hydrogen sulfide detector 520 may have a structure including the second sensor element 521.

Alternately, the second hydrogen sulfide detector 520 may have a structure including a communicating tube communicating with the inside of the outer packaging 100 (communicating port 110). In such a case, the second hydrogen sulfide detector 520 may detect hydrogen sulfide introduced through the communicating tube from the outside opening 112 side than the check valve 130 in the communicating port 110. In such a case, the second hydrogen sulfide detector 520 may be a generally known gas analyzer.

In Embodiment 5, the controller 600 may start and stop the exhausting unit 140 according to the second detection signal.

That is, for example, in the case of an exhausting unit 140 including an exhaust fan, the controller 600 may start or stop the rotation of the exhaust fan according to the second detection signal.

An example of the controlling process (method) in Embodiment 5 will now be described.

Figure 14:
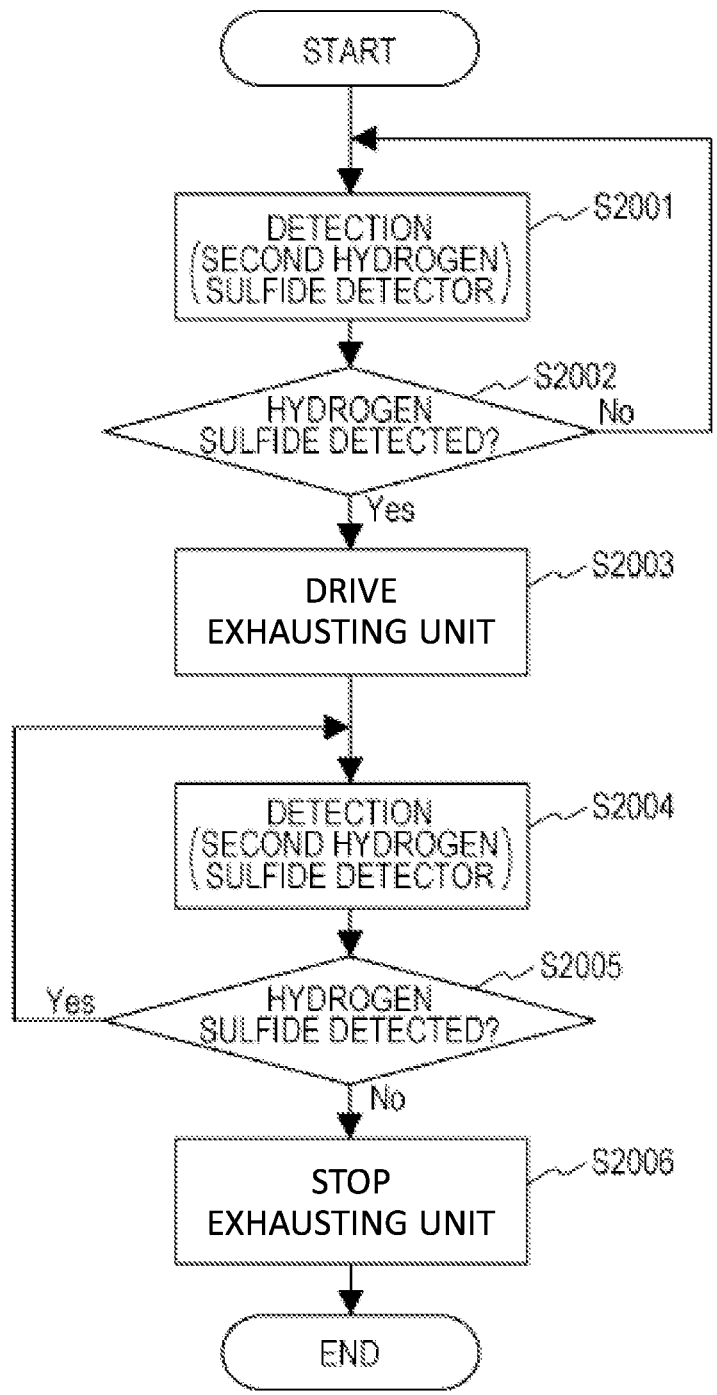
FIG. 14 is a flow chart showing an example of the controlling process in Embodiment 5.

FIG. 14 is a flow chart showing an example of the controlling process in Embodiment 5.

The controlling process in Embodiment 5 includes detection step S2001, decision step S2002, driving step S2003, detection step S2004, decision step S2005, and stopping step S2006.

In detection step S2001, the second hydrogen sulfide detector 520 detects the presence of hydrogen sulfide on the outside opening 112 side than the check valve 130 in the communicating port 110.

Decision step S2002 is carried out after detection step S2001. In decision step S2002, the controller 600 judges whether hydrogen sulfide is present on the outside opening 112 side than the check valve 130 in the communicating port 110 or not, based on the signal from the second hydrogen sulfide detector 520.

If decision step S2002 does not detect the presence of hydrogen sulfide on the outside opening 112 side than the check valve 130 in the communicating port 110 (when the second hydrogen sulfide detector 520 does not generate a second detection signal), detection step S2001 is performed again.

In contrast, if decision step S2002 detects the presence of hydrogen sulfide on the outside opening 112 side than the check valve 130 in the communicating port 110 (when the second hydrogen sulfide detector 520 generates a second detection signal), driving step S2003 is performed.

Driving step S2003 is carried out after decision step S2002. In driving step S2003, the controller 600 drives the exhausting unit 140.

If driving step S2003 is performed when the exhausting unit 140 is in a stopped state, the exhausting unit 140 starts to be operated (for example, exhaust fan starts to rotate).

If driving step S2003 is performed when the exhausting unit 140 is in an operating state, the exhausting unit 140 is continuously operated (for example, the exhaust fan continues to rotate).

Detection step S2004 is carried out after driving step S2003. In detection step S2004, the second hydrogen sulfide detector 520 detects the presence of hydrogen sulfide on the outside opening 112 side than the check valve 130 in the communicating port 110.

Decision step S2005 is carried out after detection step S2004. In decision step S2005, the controller 600 judges whether hydrogen sulfide is present on the outside opening 112 side than the check valve 130 in the communicating port 110 or not, based on the signal from the second hydrogen sulfide detector 520.

If decision step S2005 detects the presence of hydrogen sulfide on the outside opening 112 side than the check valve 130 in the communicating port 110 (when the second hydrogen sulfide detector 520 generates a second detection signal), detection step S2004 is performed again.

In contrast, if decision step S2005 does not detect the presence of hydrogen sulfide on the outside opening 112 side than the check valve 130 in the communicating port 110 (when the second hydrogen sulfide detector 520 does not generate a second detection signal), stopping step S2006 is performed.

Stopping step S2006 is carried out after decision step S2005. In stopping step S2006, the controller 600 stops the exhausting unit 140 (for example, the rotation of the exhaust fan is stopped).

As described above, in the battery system 5000 in Embodiment 5, the controller 600 may allow the exhausting unit 140 to operate during that the second detection signal is being input and may stop the exhausting unit 140 during that the second detection signal is not being input.

The structure described above allows the exhausting unit 140 not to operate during the exhausting unit 140 is not required to be driven (for example, when hydrogen sulfide is not detected or when the concentration of hydrogen sulfide is not higher than a predetermined concentration). Accordingly, the energy consumption for driving the exhausting unit 140 can be reduced. In addition, occurrence of, for example, trouble of the exhausting unit 140 by driving the exhausting unit 140 all the time can be prevented.

In the battery system 5000 in Embodiment 5, the controller 600 may change the displacement (exhaust velocity) of the exhausting unit 140 according to the second detection signal.

That is, the controller 600 may increase the displacement of the exhausting unit 140 (or may increase the exhaust velocity (the rotation speed of the exhaust fan)) when the second detection signal is input. The controlling process may be replaced by driving step S2003.

If the input of the second detection signal is terminated, the exhausting unit 140 may reduce the displacement (or may decrease the exhaust velocity (rotation speed of the exhaust fan)). This controlling process may be replaced by stopping step S2006.

Embodiment 6

Embodiment 6 will now be described. The same explanation as that in any of Embodiments 1 to 5 is appropriately omitted.

Figure 15:
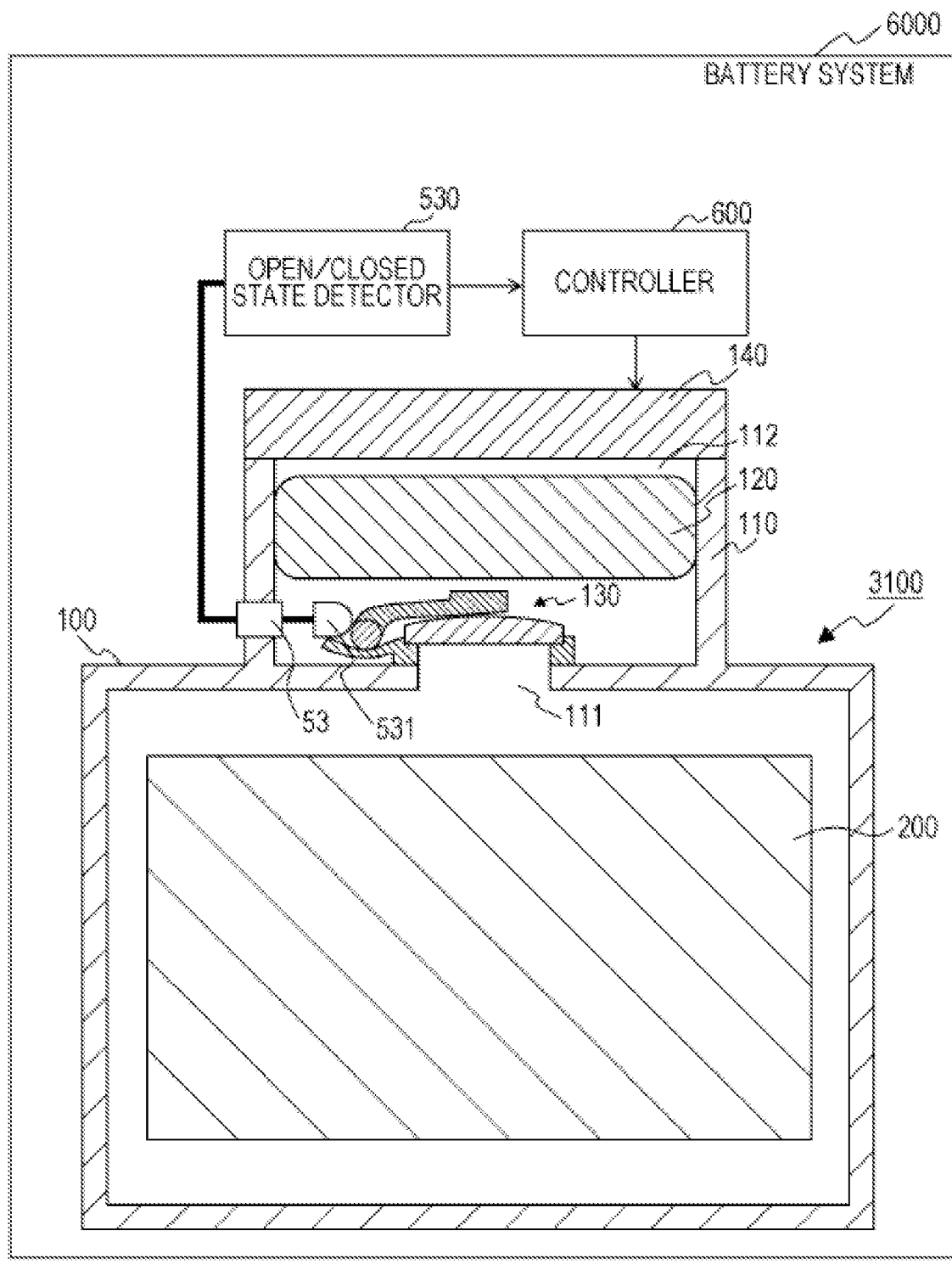
FIG. 15 is a diagram schematically illustrating the structure of a battery system in Embodiment 6.

FIG. 15 is a diagram schematically illustrating the structure of a battery system 6000 in Embodiment 6.

The battery system 6000 in Embodiment 6 includes the battery 3100 in Embodiment 3, an open/closed state detector 530 (i.e., open/closed state detecting unit), and a controller 600.

The open/closed state detector 530 detects the open or closed state of the check valve 130.

The controller 600 controls the exhausting unit 140.

The open/closed state detector 530 generates a third detection signal when the check valve 130 is in an open state.

The third detection signal is input into the controller 600.

The controller 600 drives the exhausting unit 140 when the third detection signal is input.

The structure described above can more efficiently operate the exhausting unit 140. That is, if the check valve 130 is opened when the exhausting unit 140 is in a stopped state (that is, when hydrogen sulfide is generated in the inside of the outer packaging 100 and flows out to the outside of the outer packaging 100 from the check valve 130), the exhausting unit 140 can be started to drive. Accordingly, when hydrogen sulfide generated in the inside of the outer packaging 100 is released from the check valve 130, the exhausting unit 140 can certainly and efficiently perform the introduction of hydrogen sulfide to the hydrogen sulfide eliminator 120 (elimination of hydrogen sulfide).

The battery system 6000 in Embodiment 6 may further include a third sensor element 531.

As shown in FIG. 15, the third sensor element 531 is attached to the check valve 130.

In such a case, the open/closed state detector 530 may detect the open or closed state of the check valve 130 based on the signal from the third sensor element 531.

The third sensor element 531 may be a generally known switch element (e.g., mechanical switch). For example, the switch element may be installed to the check valve 130 such that the switch element is pushed down according to the open or closed state of the check valve 130 to switch the on/off state of the switch element.

The third sensor element 531 may include a switch element and a pair of connecting wires connected to the switch element.

The connecting wire drawn to the outside of the outer packaging 100 (the outside of the communicating port 110) is connected to the open/closed state detector 530.

The connecting wire may pass through a sealing part 53 provided to the outer packaging 100 (communicating port 110) and may be drawn to the outside of the outer packaging 100 (communicating port 110). The sealing part 53 may be made of a generally known sealing material (such as a thermoplastic resin, thermosetting resin, or photo-curing resin).

In Embodiment 6, the controller 600 may start and stop the exhausting unit 140 according to the third detection signal.

That is, for example, when the exhausting unit 140 includes an exhaust fan, the controller 600 may start or stop the rotation of the exhaust fan according to the third detection signal.

An example of the controlling process (method) in Embodiment 6 will now be described.

Figure 16:
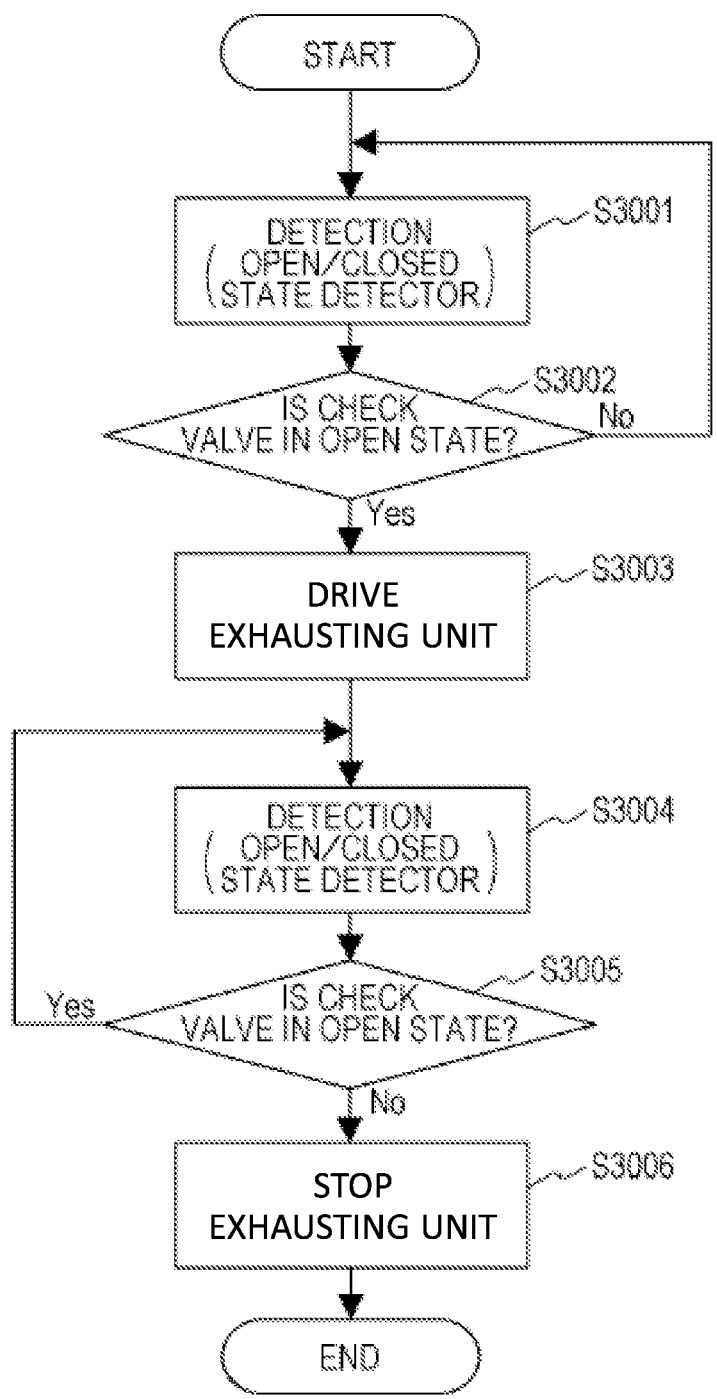
FIG. 16 is a flow chart showing an example of the controlling process in Embodiment 6.

FIG. 16 is a flow chart showing an example of the controlling process in Embodiment 6.

The controlling process in Embodiment 6 includes detection step S3001, decision step S3002, driving step S3003, detection step S3004, decision step S3005, and stopping step S3006.

In detection step S3001, the open/closed state detector 530 detects the open or closed state of the check valve 130.

Decision step S3002 is carried out after detection step S3001. In decision step S3002, the controller 600 judges whether the check valve 130 is in an open state or not, based on the signal from the open/closed state detector 530.

If decision step S3002 judges the check valve 130 not to be in an open state (when the open/closed state detector 530 does not generate a third detection signal), detection step S3001 is performed again.

In contrast, if decision step S3002 judges the check valve 130 to be in an open state (when the open/closed state detector 530 generates a third detection signal), driving step S3003 is performed.

The driving step S3003 is carried out after decision step S3002. In driving step S3003, the controller 600 drives the exhausting unit 140.

If driving step S3003 is performed when the exhausting unit 140 is in a stopped state, the exhausting unit 140 starts to be operated (for example, exhaust fan starts to rotate).

If driving step S3003 is performed when the exhausting unit 140 is in an operating state, the exhausting unit 140 continues the operation (for example, the exhaust fan continues to rotate).

Detection step S3004 is carried out after driving step S3003. In detection step S3004, the open/closed state detector 530 detects the open or closed state of the check valve 130.

Decision step S3005 is carried out after detection step S3004. In decision step S3005, the controller 600 judges whether the check valve 130 is in an open state or not, based on the signal from the open/closed state detector 530.

If decision step S3005 judges the check valve 130 to be in an open state (when the open/closed state detector 530 generates a third detection signal), detection step S3004 is performed again.

In contrast, if decision step S3005 judges the check valve 130 not to be in an open state (when the open/closed state detector 530 does not generate a third detection signal), stopping step S3006 is performed.

Stopping step S3006 is carried out after decision step S3005. In stopping step S3006, the controller 600 stops the exhausting unit 140 (for example, the rotation of the exhaust fan is stopped).

In the battery system 6000 in Embodiment 6, the controller 600 may change the displacement (exhaust velocity) of the exhausting unit 140 according to the third detection signal.

That is, the controller 600 may increase the displacement of the exhausting unit 140 (or may increase the exhaust velocity (the rotation speed of the exhaust fan)) when the third detection signal is input. The controlling process may be replaced by driving step S3003.

If the input of the third detection signal is terminated, the exhausting unit 140 may reduce the displacement (or may decrease the exhaust velocity (rotation speed of the exhaust fan)). This controlling process may be replaced by stopping step S3006.

Embodiment 7

Embodiment 7 will now be described. The same explanation as that in any of Embodiments 1 to 6 is appropriately omitted.

Figure 17:
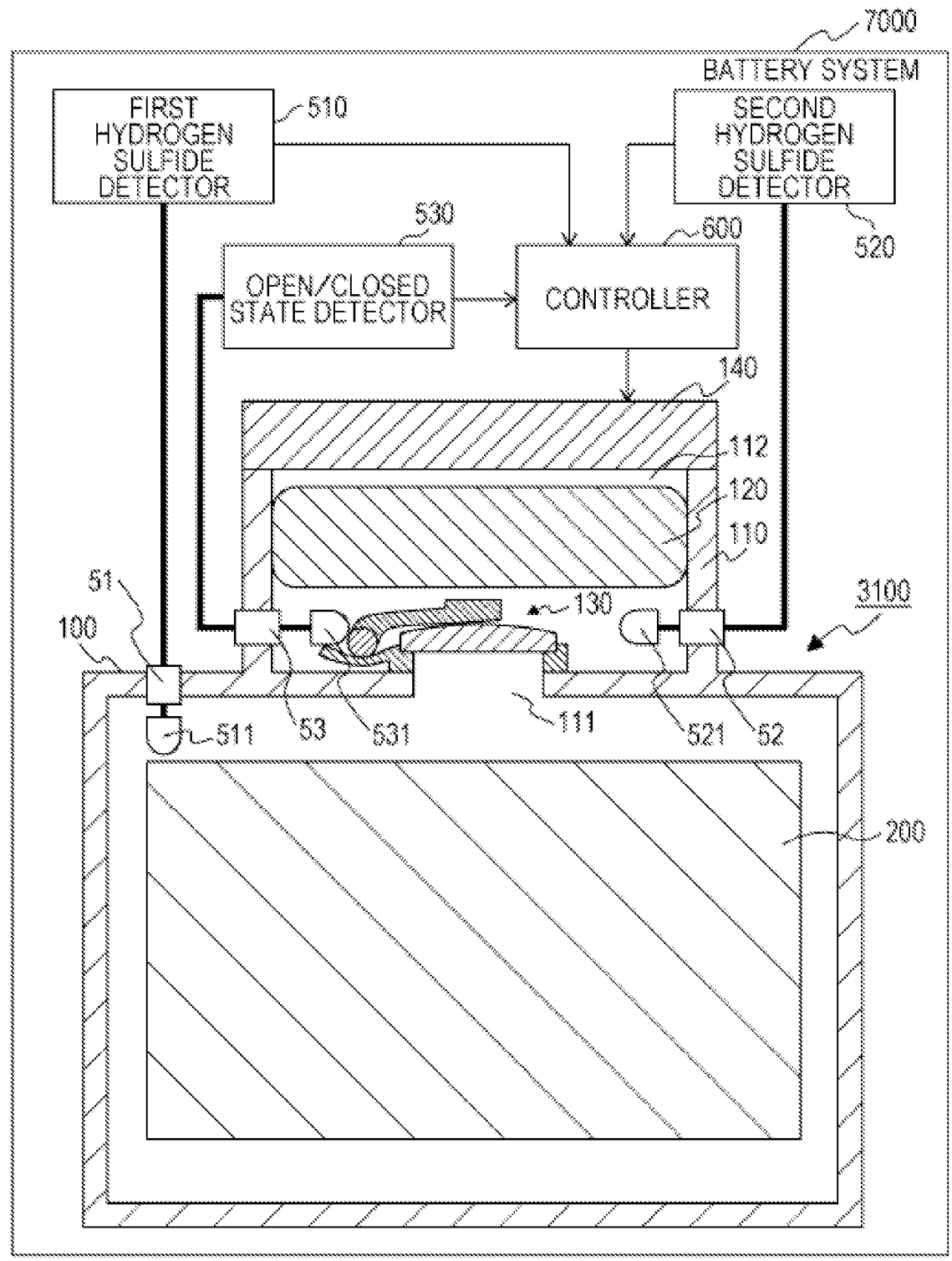
FIG. 17 is a diagram schematically illustrating the structure of a battery system in Embodiment 7.

FIG. 17 is a diagram schematically illustrating the structure of a battery system 7000 in Embodiment 7.

The battery system 7000 in Embodiment 7 includes the battery 3100 in Embodiment 3, a first hydrogen sulfide detector 510, a second hydrogen sulfide detector 520, an open/closed state detector 530, and a controller 600.

A first detection signal, a second detection signal, and a third detection signal are input into the controller 600.

The controller 600 controls the exhausting unit 140 according to the first detection signal, the second detection signal, and the third detection signal.

The structure described above can more efficiently operate the exhausting unit 140. That is, the state of occurrence of hydrogen sulfide can be more precisely judged based on the first detection signal. In addition, the state of exhaust (remaining state) of hydrogen sulfide can be more precisely judged based on the second detection signal. Furthermore, the state of outflow of hydrogen sulfide can be more precisely judged based on the third detection signal. Accordingly, based on these states, the exhausting unit 140 can certainly and efficiently perform the introduction of hydrogen sulfide to the hydrogen sulfide eliminator 120 (elimination of hydrogen sulfide).

In Embodiment 7, the controller 600 may start and stop the exhausting unit 140 according to the first detection signal, the second detection signal, and the third detection signal.

That is, for example, when the exhausting unit 140 includes an exhaust fan, the controller 600 may start or stop the rotation of the exhaust fan according to the first detection signal, the second detection signal, and the third detection signal.

An example of the controlling process (method) in Embodiment 7 will now be described.

Figure 18:
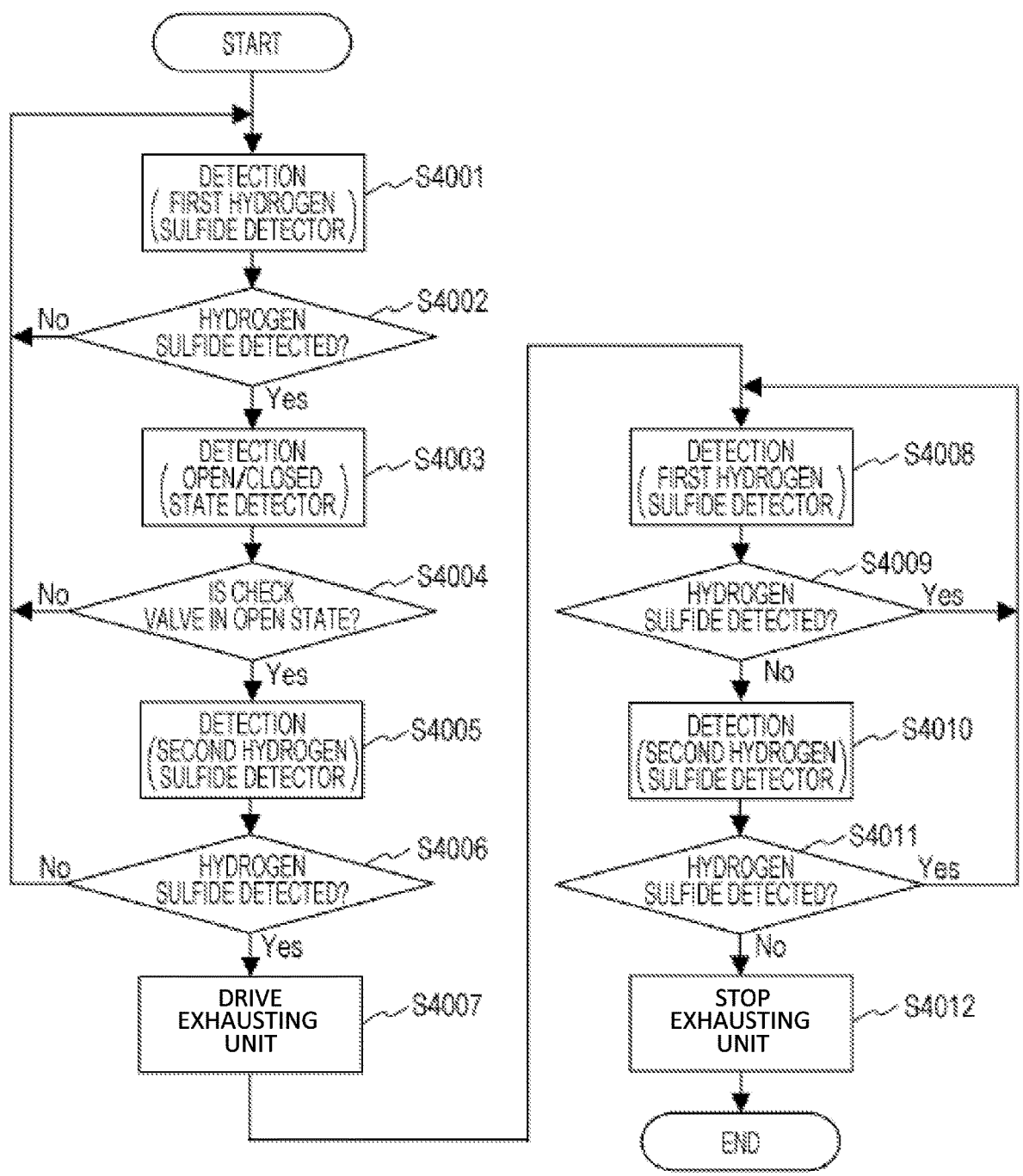
FIG. 18 is a flow chart showing an example of the controlling process in Embodiment 7.

FIG. 18 is a flow chart showing an example of the controlling process in Embodiment 7.

The controlling process in Embodiment 7 includes detection step S4001, decision step S4002, detection step S4003, decision step S4004, detection step S4005, decision step S4006, driving step S4007, detection step S4008, decision step S4009, detection step S4010, decision step S4011, and stopping step S4012.

In detection step S4001, the first hydrogen sulfide detector 510 detects the presence of hydrogen sulfide in the inside of the outer packaging 100.

Decision step S4002 is carried out after detection step S4001. In decision step S4002, the controller 600 judges whether hydrogen sulfide is present in the inside of the outer packaging 100 or not, based on the signal from the first hydrogen sulfide detector 510.

If decision step S4002 does not detect the presence of hydrogen sulfide in the inside of the outer packaging 100 (when the first hydrogen sulfide detector 510 does not generate a first detection signal), detection step S4001 is performed again.

In contrast, if decision step S4002 detects the presence of hydrogen sulfide in the inside of the outer packaging 100 (when the first hydrogen sulfide detector 510 generates a first detection signal), detection step S4003 is performed.

Detection step S4003 is carried out after decision step S4002. In detection step S4003, the open/closed state detector 530 detects the open or closed state of the check valve 130.

Decision step S4004 is carried out after detection step S4003. In decision step S4004, the controller 600 judges whether the check valve 130 is in an open state or not, based on the signal from the open/closed state detector 530.

If decision step S4004 judges the check valve 130 not to be in an open state (when the open/closed state detector 530 does not generate a third detection signal), detection step S4001 is performed again.

In contrast, if decision step S4004 judges the check valve 130 to be in an open state (when the open/closed state detector 530 generates a third detection signal), detection step S4005 is performed.

Detection step S4005 is carried out after decision step S4004. In detection step S4005, the second hydrogen sulfide detector 520 detects the presence of hydrogen sulfide on the outside opening 112 side than the check valve 130 in the communicating port 110.

Decision step S4006 is carried out after detection step S4005. In decision step S4006, the controller 600 judges whether hydrogen sulfide is present on the outside opening 112 side than the check valve 130 in the communicating port 110 or not, based on the signal from the second hydrogen sulfide detector 520.

If decision step S4006 does not detect the presence of hydrogen sulfide on the outside opening 112 side than the check valve 130 in the communicating port 110 (when the second hydrogen sulfide detector 520 does not generate a second detection signal), detection step S4001 is performed again.

In contrast, if decision step S4006 detects the presence of hydrogen sulfide on the outside opening 112 side than the check valve 130 in the communicating port 110 (when the second hydrogen sulfide detector 520 generates a second detection signal), driving step S4007 is performed.

Driving step S4007 is carried out after decision step S4006. In driving step S4007, the controller 600 drives the exhausting unit 140.

If driving step S4007 is performed when the exhausting unit 140 is in a stopped state, the exhausting unit 140 starts to be operated (for example, exhaust fan starts to rotate).

If driving step S4007 is performed when the exhausting unit 140 is in an operating state, the exhausting unit 140 continues the operation (for example, the exhaust fan continues to rotate).

Detection step S4008 is carried out after driving step S4007. In detection step S4008, the first hydrogen sulfide detector 510 detects the presence of hydrogen sulfide in the inside of the outer packaging 100.

Decision step S4009 is carried out after detection step S4008. In decision step S4009, the controller 600 judges whether hydrogen sulfide is present in the inside of the outer packaging 100 or not, based on the signal from the first hydrogen sulfide detector 510.

If decision step S4009 detects the presence of hydrogen sulfide in the inside of the outer packaging 100 (when the first hydrogen sulfide detector 510 generates a first detection signal), detection step S4008 is performed again.

In contrast, if decision step S4009 does not detect the presence of hydrogen sulfide in the inside of the outer packaging 100 (when the first hydrogen sulfide detector 510 does not generate a first detection signal), detection step S4010 is performed.

Detection step S4010 is carried out after decision step S4009. In detection step S4010, the second hydrogen sulfide detector 520 detects the presence of hydrogen sulfide on the outside opening 112 side than the check valve 130 in the communicating port 110.

Decision step S4011 is carried out after detection step S4010. In decision step S4011, the controller 600 judges whether hydrogen sulfide is present on the outside opening 112 side than the check valve 130 in the communicating port 110 or not, based on the signal from the second hydrogen sulfide detector 520.

If decision step S4011 detects the presence of hydrogen sulfide on the outside opening 112 side than the check valve 130 in the communicating port 110 (when the second hydrogen sulfide detector 520 generates a second detection signal), detection step S4008 is performed again.

In contrast, if decision step S4011 does not detect the presence of hydrogen sulfide on the outside opening 112 side than the check valve 130 in the communicating port 110 (when the second hydrogen sulfide detector 520 does not generate a second detection signal), stopping step S4012 is performed.

Stopping step S4012 is carried out after decision step S4011. In stopping step S4012, the controller 600 stops the exhausting unit 140 (for example, the rotation of the exhaust fan is stopped).

In the battery system 6000 in Embodiment 7, controller 600 may change the displacement (exhaust velocity) of the exhausting unit 140 according to the first detection signal, the second detection signal, and the third detection signal.

That is, the controller 600 may increase the displacement of the exhausting unit 140 (or may increase the exhaust velocity (the rotation speed of the exhaust fan)) when the first detection signal, the second detection signal, and the third detection signal are input. The controlling process may be replaced by driving step S4007.

If the input of the first detection signal, the second detection signal, and the third detection signal is terminated, the exhausting unit 140 may reduce the displacement (or may decrease the exhaust velocity (rotation speed of the exhaust fan)). This controlling process may be replaced by stopping step S4012.

In Embodiments 4 to 7, the controller 600 may be composed of, for example, a processor and a memory. The processor may be, for example, a central processing unit (CPU) or a micro-processing unit (MPU). In such a case, the processor may perform the controlling process shown in the present disclosure by reading out the program stored in the memory and implementing the program.

Embodiment 8

Embodiment 8 will now be described. The same explanation as that in any of Embodiments 1 to 7 is appropriately omitted.

Figure 19:
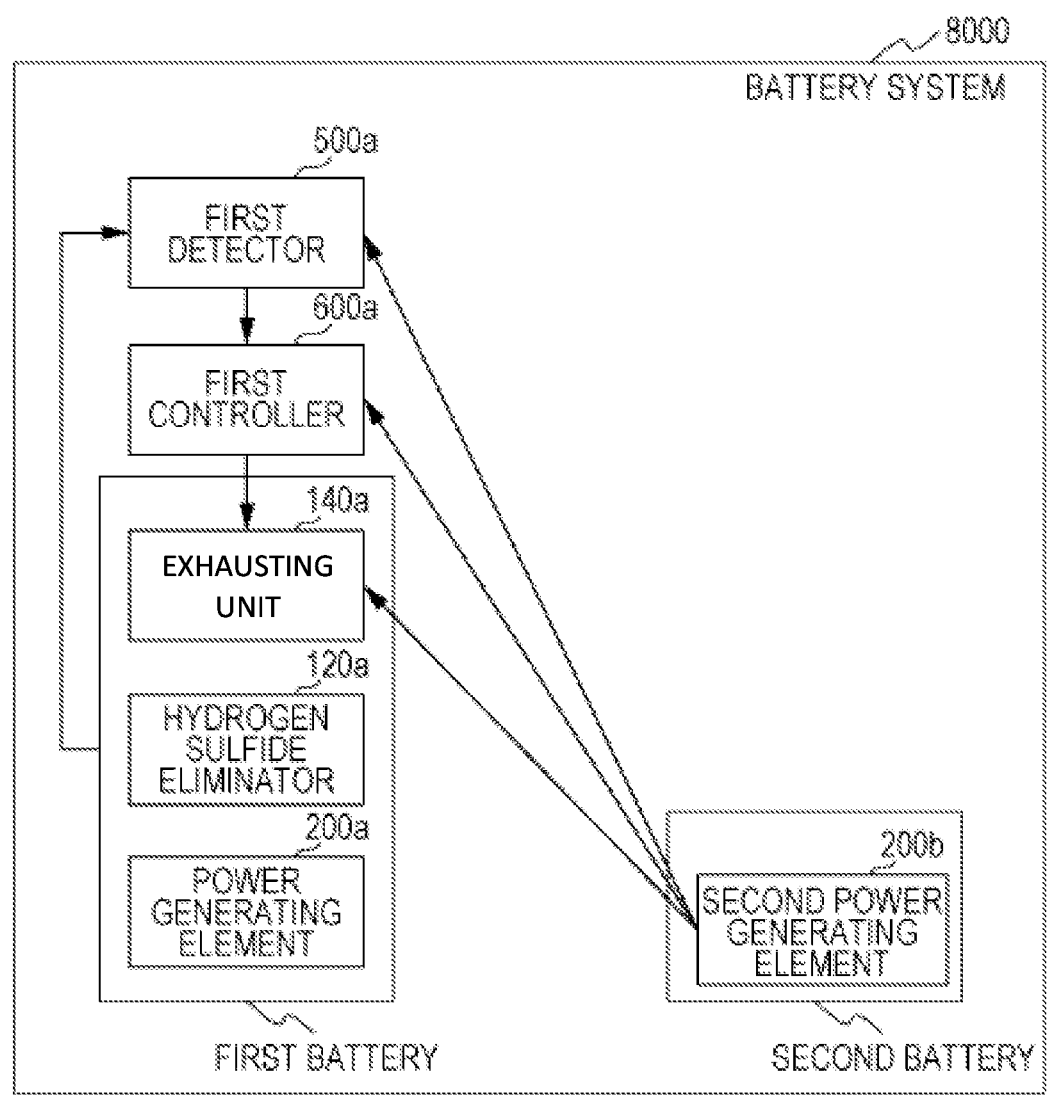
FIG. 19 is a diagram schematically illustrating the structure of a battery system in Embodiment 8.

FIG. 19 is a diagram schematically illustrating the structure of a battery system 8000 in Embodiment 8.

The battery system 8000 in Embodiment 8 includes a first battery and a second battery.

The first battery includes a power generating element 200a, a hydrogen sulfide eliminator 120a, and an exhausting unit 140a.

The second battery includes a second power generating element 200b.

The exhausting unit 140a and the second power generating element 200b are electrically connected to each other.

The power necessary for driving the exhausting unit 140a is supplied to the exhausting unit 140a from the second power generating element 200b.

The structure described above can more certainly operate the exhausting unit 140a. That is, even if the power generating element 200a of the first battery cannot generate power due to a defect (e.g., a deterioration in the power generating element 200a associated with occurrence of hydrogen sulfide) caused in the first battery, the second power generating element 200b of the second battery, which is different from the first battery, can supply power to the exhausting unit 140a. As a result, even if no power is supplied from the power generating element 200a of the first battery, the exhausting unit 140a can certainly perform the introduction of hydrogen sulfide to the hydrogen sulfide eliminator 120a (elimination of hydrogen sulfide).

The first battery may be, for example, any of the batteries described in Embodiments 3 to 7.

That is, the first battery may further include the outer packaging 100a.

The power generating element 200a may be included in the outer packaging 100a and is disposed (accommodated) in the inside of the outer packaging 100a.

The outer packaging 100a may include a communicating port 110a, a hydrogen sulfide eliminator 120a, and an exhausting unit 140a.

The communicating port 110a may communicate between the inside and the outside of the outer packaging 100a.

The hydrogen sulfide eliminator 120a and the exhausting unit 140a may be disposed in the communicating port 110a.

The exhausting unit 140a may introduce hydrogen sulfide generated caused by the sulfur-based material contained in the power generating element 200a to the communicating port 110a.

The hydrogen sulfide eliminator 120a may eliminate the hydrogen sulfide introduced by the exhausting unit 140a to the communicating port 110a.

As the structure of each component (the outer packaging 100a, the communicating port 110a, the hydrogen sulfide eliminator 120a, the exhausting unit 140a, and the power generating element 200a) of the first battery, the structures described in Embodiments 1 to 7 can be appropriately employed.

The battery system 8000 in Embodiment 8 may further include a first detector 500a and a first controller 600a.

The first detector 500a detects hydrogen sulfide in the first battery.

The first controller 600a controls the exhausting unit 140a.

The first detector 500a generates a first signal when hydrogen sulfide is present in the first battery.

The first signal is input into the first controller 600a.

The first controller 600a controls the exhausting unit 140a according to the first signal.

In such a case, the first detector 500a and the second power generating element 200b may be electrically connected to each other.

In such a case, the power necessary for detecting hydrogen sulfide by the first detector 500a may be supplied from the second power generating element 200b to the first detector 500a.

The structure described above can further certainly operate the first detector 500a. That is, even if the power generating element 200a of the first battery cannot generate power due to a defect (e.g., a deterioration in the power generating element 200a associated with occurrence of hydrogen sulfide) caused in the first battery, the second power generating element 200b of the second battery, which is different from the first battery, can supply power to the first detector 500a. As a result, even if no power is supplied from the power generating element 200a of the first battery, the exhausting unit 140a can certainly and efficiently perform the introduction of hydrogen sulfide to the hydrogen sulfide eliminator 120a (elimination of hydrogen sulfide) according to the result of detection of hydrogen sulfide by the first detector 500a.

The first detector 500a can appropriately employ the structure of any of the detectors described in Embodiments 4 to 7. For example, the first detector 500a may include, for example, a voltage applying unit and a current applying unit. In such a case, the voltage applying unit and the current applying unit may use the power supplied from the second power generating element 200b.

The first controller 600a can appropriately employ the structure of any of the controllers described in Embodiments 4 to 7.

In the battery system 8000 in Embodiment 8, the first controller 600a and the second power generating element 200b may be electrically connected to each other.

In such a case, the power necessary for controlling the exhausting unit 140a by the first controller 600a may be supplied from the second power generating element 200b to the first controller 600a.

The structure described above can further certainly operate the first controller 600a. That is, even if the power generating element 200a of the first battery cannot generate power due to a defect (e.g., a deterioration in the power generating element 200a associated with occurrence of hydrogen sulfide) caused in the first battery, the second power generating element 200b of the second battery, which is different from the first battery, can supply power to the first controller 600a. As a result, even if no power is supplied from the power generating element 200a of the first battery, the exhausting unit 140a can certainly and efficiently perform the introduction of hydrogen sulfide to the hydrogen sulfide eliminator 120a (elimination of hydrogen sulfide) according to the result of detection of hydrogen sulfide by the first detector 500a.

In the battery system 8000 in Embodiment 8, a power switch may be disposed in the path connecting between the exhausting unit 140a and the second power generating element 200b. In such a case, the first controller 600a may control the exhausting unit 140a (e.g., switching between the driving and stopping of the exhausting unit 140a) by switching on and off of the power switch.

In the battery system 8000 in Embodiment 8, the second battery may be, for example, a generally known primary battery or secondary battery.

The second battery may be a battery independent from the first battery. That is, for example, the power generating element 200a of the first battery and the second power generating element 200b of the second battery need not to be electrically connected to each other.

Figure 20:
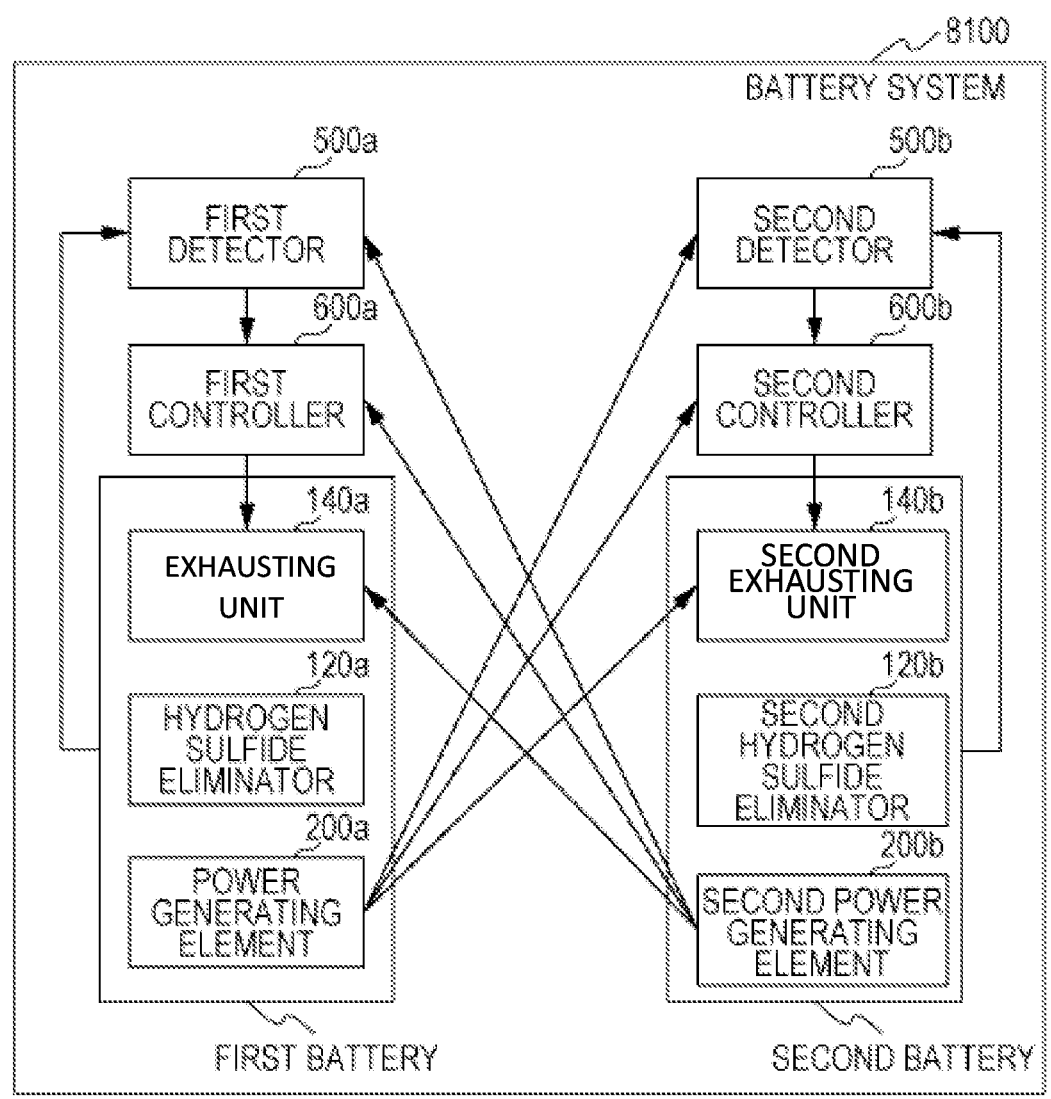
FIG. 20 is a diagram schematically illustrating the structure of another battery system in Embodiment 8.

FIG. 20 is a diagram schematically illustrating the structure of a battery system 8100 in Embodiment 8.

The battery system 8100 in Embodiment 8 further includes the following structure in addition to the structure of the battery system 8000 in Embodiment 8.

That is, in the battery system 8100 in Embodiment 8, the second battery includes a second power generating element 200b, a second hydrogen sulfide eliminator 120b, and a second exhausting unit 140b.

The second power generating element 200b contains a sulfur-based material.

The second exhausting unit 140b introduces hydrogen sulfide generated caused by the sulfur-based material contained in the second power generating element 200b to the second hydrogen sulfide eliminator 120b.

The second hydrogen sulfide eliminator 120b eliminates the hydrogen sulfide introduced by the second exhausting unit 140b.

The second exhausting unit 140b and the power generating element 200a of the first battery are electrically connected to each other.

The power necessary for driving the second exhausting unit 140b is supplied from the power generating element 200a of the first battery to the second exhausting unit 140b.

The structure described above can more certainly operate the second exhausting unit 140b. That is, even if the second power generating element 200b of the second battery cannot generate power due to a defect (e.g., a deterioration in the second power generating element 200b associated with occurrence of hydrogen sulfide) caused in the second battery, the power generating element 200a of the first battery, which is different from the second battery, can supply power to the second exhausting unit 140b. As a result, even if no power is supplied from the second power generating element 200b of the second battery, the second exhausting unit 140b can certainly perform the introduction of hydrogen sulfide to the second hydrogen sulfide eliminator 120b (elimination of hydrogen sulfide).

The second battery may be, for example, any of the batteries described in Embodiments 3 to 7.

That is, the second battery may further include a second outer packaging 100b.

The second power generating element 200b is included in the second outer packaging 100b and is disposed (accommodated) in the inside of the second outer packaging 100b.

The second outer packaging 100b may include a second communicating port 110b, a second hydrogen sulfide eliminator 120b, and a second exhausting unit 140b.

The second communicating port 110b may communicate between the inside and the outside of the second outer packaging 100b.

The second hydrogen sulfide eliminator 120b and the second exhausting unit 140b may be disposed in the second communicating port 110b.

The second exhausting unit 140b may introduce hydrogen sulfide generated caused by the sulfur-based material contained in the second power generating element 200b to the second communicating port 110b.

The second hydrogen sulfide eliminator 120b may eliminate the hydrogen sulfide introduced to the second communicating port 110b by the second exhausting unit 140b.

As the structure of each component (the second outer packaging 100b, the second communicating port 110b, the second hydrogen sulfide eliminator 120b, the second exhausting unit 140b, and the second power generating element 200b) of the second battery, the structures described in Embodiments 1 to 7 can be appropriately employed.

The battery system 8100 in Embodiment 8 may further include a second detector 500b and a second controller 600b.

The second detector 500b detects hydrogen sulfide in the second battery.

The second controller 600b controls the second exhausting unit 140b.

The second detector 500b generates a second signal when hydrogen sulfide is present in the second battery.

The second signal is input into the second controller 600b.

The second controller 600b controls the second exhausting unit 140b according to the second signal.

In such a case, the second detector 500b and the power generating element 200a of the first batter may be electrically connected to each other.

In such a case, the power necessary for detecting hydrogen sulfide by the second detector 500b may be supplied from the power generating element 200a of the first battery to the second detector 500b.

The structure described above can more certainly operate the second detector 500b. That is, even if the second power generating element 200b of the second battery cannot generate power due to a defect (e.g., a deterioration in the second power generating element 200b associated with occurrence of hydrogen sulfide) caused in the second battery, the power generating element 200a of the first battery, which is different from the second battery, can supply power to the second detector 500b. As a result, even if no power is supplied from the second power generating element 200b of the second battery, the second exhausting unit 140b can certainly and efficiently perform the introduction of hydrogen sulfide to the second hydrogen sulfide eliminator 120b (elimination of hydrogen sulfide) according to the result of detection of hydrogen sulfide by the second detector 500b.

The second detector 500b can appropriately employ the structure of any of the detectors described in Embodiments 4 to 7. For example, the second detector 500b may include, for example, a voltage applying unit and a current applying unit. In such a case, the voltage applying unit and the current applying unit may use the power supplied from the power generating element 200a of the first battery.

The second controller 600b can appropriately employ the structure of any of the controllers described in Embodiments 4 to 7.

In the battery system 8100 in Embodiment 8, the second controller 600b and the power generating element 200a of the first battery may be electrically connected to each other.

In such a case, the power necessary for controlling the second exhausting unit 140b by the second controller 600b may supplied to the second controller 600b from the power generating element 200a of the first battery.

The structure described above can more certainly operate the second controller 600b. That is, even if the second power generating element 200b of the second battery cannot generate power due to a defect (e.g., a deterioration in the second power generating element 200b associated with occurrence of hydrogen sulfide) caused in the second battery, the power generating element 200a of the first battery, which is different from the second battery, can supply power to the second controller 600b. As a result, even if no power is supplied from the second power generating element 200b of the second battery, the second exhausting unit 140b can certainly and efficiently perform the introduction of hydrogen sulfide to the second hydrogen sulfide eliminator 120b (elimination of hydrogen sulfide) according to the result of detection of hydrogen sulfide by the second detector 500b.

In the battery system 8100 in Embodiment 8, a power switch may be disposed in the path connecting between the second exhausting unit 140b and the power generating element 200a of the first battery. In such a case, the second controller 600b may control the exhausting unit 140b (e.g., switching between the driving and stopping of the exhausting unit 140b) by switching on and off of the power switch.

FIG. 21 is a perspective view schematically illustrating the structure of a battery pack in Embodiment 8.

The battery pack in Embodiment 8 includes the first battery and the second battery described in the battery system 8100 in Embodiment 8.

The first battery further includes a first electrode terminal 410a and a second electrode terminal 420a.

The second battery further includes a first electrode terminal 410b and a second electrode terminal 420b.

In the structure shown in FIG. 21, the second electrode terminal 420a of the first battery and the first electrode terminal 410b of the second battery are electrically connected to each other. The second electrode terminal 420a of the first battery and the first electrode terminal 410b of the second battery may be connected to each other with, for example, a connecting member 40. In such a case, the power generating element 200a of the first battery and the second power generating element 200b of the second battery are connected to each other in series or in parallel.

The first electrode terminal 410a of the first battery and the second electrode terminal 420b of the second battery may be connected to a load or device in the outside. In such a case, the battery pack in Embodiment 8 can supply power to the load or device in the outside.

As described above, in Embodiment 8, the first battery and the second battery may constitute a single battery pack (or a battery module).

Alternatively, in Embodiment 8, the power generating element 200a of the first battery and the second power generating element 200b of the second battery need not to be electrically connected to each other. For example, the first battery and the second battery may respectively constitute different battery packs (battery modules).

In Embodiment 8, the exhausting unit 140a (communicating port 110a) and the second exhausting unit 140b (second communicating port 110b) may be respectively connected to different exhaust paths.

Alternatively, the exhausting unit 140a (communicating port 110a) and the second exhausting unit 140b (second communicating port 110b) may be connected to a same exhaust path.

These exhaust paths (e.g., an exhaust tube pipe or exhaust system) can exhaust the air after elimination of the hydrogen sulfide gas generated in the battery of the present disclosure to the outside of the structure (e.g., automobile) on which the battery of the present disclosure is mounted.

The structures described in Embodiments 1 to 8 may be appropriately combined.

The battery of the present disclosure can be utilized as, for example, an all-solid-lithium secondary battery. The battery system of the present disclosure can be utilized as, for example, an on-vehicle battery system.

What is claimed is:

1. A battery system comprising:
    a first battery;
    a first hydrogen sulfide detector that detects the presence of hydrogen sulfide; and
    a first controller that controls an exhausting unit, wherein
        the first battery includes an outer packaging and a power generating element that contains a sulfur-based material and is included in the outer packaging and disposed in an inside of the outer packaging;
        the outer packaging includes a communicating port, a hydrogen sulfide eliminator, and the exhausting unit;
        the communicating port communicates between the inside and an outside of the outer packaging;
        the hydrogen sulfide eliminator and the exhausting unit are disposed in the communicating port;
        the exhausting unit introduces hydrogen sulfide generated caused by the sulfur-based material to the communicating port;
        the hydrogen sulfide eliminator eliminates the hydrogen sulfide introduced to the communicating port by the exhausting unit;
    the first hydrogen sulfide detector detects the presence of hydrogen sulfide in the inside of the outer packaging;
    the first hydrogen sulfide detector generates a first detection signal when hydrogen sulfide is present in the inside of the outer packaging;
    the first detection signal is input into the first controller; and
    the first controller controls the exhausting unit according to the first detection signal.

2. The battery system according to claim 1, wherein
    the first controller operates the exhausting unit during the first detection signal is being input; and
    the first controller stops the exhausting unit during the first detection signal is not being input.

3. The battery system according to claim 1, further comprising:
    a second battery including a second power generating element, wherein
    the exhausting unit and the second power generating element are electrically connected to each other; and
    power necessary for driving the exhausting unit is supplied from the second power generating element to the exhausting unit.

4. The battery system according to claim 3, further comprising:
    the first hydrogen sulfide detector detecting hydrogen sulfide in the first battery; and
    the first controller controlling the exhausting unit, wherein
    the first hydrogen sulfide detector generates a first signal when hydrogen sulfide is present in the first battery;
    the first signal is input into the first controller;
    the first controller controls the exhausting unit according to the first signal;
    the first hydrogen sulfide detector and the second power generating element are electrically connected to each other; and
    power necessary for detecting hydrogen sulfide by the first hydrogen sulfide detector is supplied from the second power generating element to the first hydrogen sulfide detector.

5. The battery system according to claim 4, wherein
    the first controller and the second power generating element are electrically connected to each other; and
    power necessary for controlling the exhausting unit by the first controller is supplied from the second power generating element to the first controller.

6. The battery system according to claim 3, wherein
    the second battery further includes a second outer packaging;
    the second power generating element contains a sulfur-based material and is included in the second outer packaging and disposed in the inside of the second outer packaging;
    the second outer packaging includes a second communicating port, a second hydrogen sulfide eliminator, and a second exhausting unit;
    the second communicating port communicates between the inside and the outside of the second outer packaging;
    the second hydrogen sulfide eliminator and the second exhausting unit are disposed in the second communicating port;
    the second exhausting unit introduces hydrogen sulfide generated caused by the sulfur-based material contained in the second power generating element to the second communicating port;
    the second hydrogen sulfide eliminator eliminates hydrogen sulfide introduced to the second communicating port by the second exhausting unit;
    the second exhausting unit and the power generating element of the first battery are electrically connected to each other; and
    power necessary for driving the second exhausting unit is supplied from the power generating element of the first battery to the second exhausting unit.

7. The battery system according to claim 6, further comprising:
    a second detector detecting hydrogen sulfide in the second battery; and
    a second controller controlling the second exhausting unit, wherein
    the second detector generates a second signal when hydrogen sulfide is present in the second battery;
    the second signal is input into the second controller;
    the second controller controls the second exhausting unit according to the second signal;
    the second detector and the power generating element of the first battery are electrically connected to each other; and
    power necessary for detecting the hydrogen sulfide by the second detector is supplied from the power generating element of the first battery to the second detector.

8. The battery system according to claim 7, wherein
the second controller and the power generating element of the first battery are electrically connected to each other; and
power necessary for controlling the second exhausting unit by the second controller is supplied from the power generating element of the first battery to the second controller.

9. The battery system according to claim 1, wherein
the communicating port includes an inside opening located in the inside of the outer packaging and an outside opening located in the outside of the outer packaging;
the exhausting unit is disposed in the outside opening; and
the hydrogen sulfide eliminator is disposed on the inside opening side opposite the exhausting unit.

10. The battery system according to claim 1, wherein
the first battery includes a housing;
the power generating element is sealed and included in the housing; and
the housing is included in the outer packaging.

11. The battery system according to claim 1, wherein
the power generating element includes a first power generating element containing the sulfur-based material and a second power generating element containing the sulfur-based material; and
the first power generating element and the second power generating element are included in the outer packaging.

12. The battery system according to claim 11, wherein
the first battery includes a first housing and a second housing;
the first power generating element is sealed and included in the first housing;
the second power generating element is sealed and included in the second housing; and
the first housing and the second housing are included in the outer packaging.

13. The battery system according to claim 1, wherein
the communicating port further includes a check valve; and
the check valve is opened when the generation of hydrogen sulfide increases the internal pressure in the inside of the outer packaging.

14. The battery system according to claim 13, wherein
the communicating port includes an inside opening located in the inside of the outer packaging and an outside opening located in the outside of the outer packaging;
the check valve is disposed on the inside opening side; and
the hydrogen sulfide eliminator is disposed on the outside opening side.

15. The battery system according to claim 13, wherein
the communicating port includes an inside opening located in the inside of the outer packaging and an outside opening located in the outside of the outer packaging;
the check valve is disposed on the outside opening side; and
the hydrogen sulfide eliminator is disposed on the inside opening side.

16. The battery system according to claim 13, further comprising:
a second hydrogen sulfide detector that detects hydrogen sulfide; and
the first controller that controls the exhausting unit, wherein
the communicating port includes an inside opening located in the inside of the outer packaging and an outside opening located in the outside of the outer packaging;
the second hydrogen sulfide detector detects the presence of hydrogen sulfide on the outside opening side than the check valve in the communicating port;
the second hydrogen sulfide detector generates a second detection signal when hydrogen sulfide is present on the outside opening side than the check valve in the communicating port;
the second detection signal is input into the first controller; and
the first controller controls the exhausting unit according to the second detection signal.

17. The battery system according to claim 16, wherein
the first controller operates the exhausting unit during the second detection signal is being input; and
the first controller stops the exhausting unit during the second detection signal is not being input.

18. The battery system according to claim 13, further comprising:
an open/closed state detector detecting an open or closed state of the check valve; and
the first controller controlling the exhausting unit, wherein
the open/closed state detector generates a third detection signal when the check valve is in an open state;
the third detection signal is input into the first controller; and
the first controller drives the exhausting unit when the third detection signal is input.

* * * * *